(12) United States Patent
Guo et al.

(10) Patent No.: US 9,491,491 B2
(45) Date of Patent: Nov. 8, 2016

(54) RUN-MODE BASED COEFFICIENT CODING FOR VIDEO CODING

(75) Inventors: Liwei Guo, San Diego, CA (US); Marta Karczewicz, San Diego, CA (US); Xianglin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 525 days.

(21) Appl. No.: 13/484,068

(22) Filed: May 30, 2012

(65) Prior Publication Data

US 2012/0307888 A1 Dec. 6, 2012

Related U.S. Application Data

(60) Provisional application No. 61/493,337, filed on Jun. 3, 2011, provisional application No. 61/504,673, filed on Jul. 5, 2011, provisional application No. 61/538,658, filed on Sep. 23, 2011.

(51) Int. Cl.
| | | |
|---|---|---|
| H04N 7/30 | (2006.01) | |
| H04N 7/26 | (2006.01) | |
| H04N 7/32 | (2006.01) | |
| H04N 19/93 | (2014.01) | |
| H04N 19/176 | (2014.01) | |
| H04N 19/13 | (2014.01) | |
| H04N 19/60 | (2014.01) | |
| H04N 19/91 | (2014.01) | |
| H04N 19/18 | (2014.01) | |

(52) U.S. Cl.
CPC ............ *H04N 19/93* (2014.11); *H04N 19/13* (2014.11); *H04N 19/176* (2014.11); *H04N 19/18* (2014.11); *H04N 19/60* (2014.11); *H04N 19/91* (2014.11)

(58) Field of Classification Search
USPC .......................................................... 375/240
See application file for complete search history.

(56) References Cited

U.S. PATENT DOCUMENTS 6,414,608 B1 * 7/2002 Nishida et al. ................. 341/67
7,116,829 B1 * 10/2006 Boon ............................ 382/233
(Continued)

FOREIGN PATENT DOCUMENTS

| CN | 101222637 A | 7/2008 |
|---|---|---|
| EP | 1868388 A2 | 12/2007 |

(Continued)

OTHER PUBLICATIONS

Wiegand et al., "Overview of the H.264/AVC Video Coding Standard", Circuits and Systems for Video Technology, IEEE vol. 13 No. 7, pp. 560-576, Jul. 2003.*

(Continued)

*Primary Examiner* — Tracy Y Li
*Assistant Examiner* — Mohammad J Rahman
(74) *Attorney, Agent, or Firm* — Shumaker & Sieffert, P.A.

(57) ABSTRACT

A video coding device is configured to code coefficients of residual blocks of video data. When a coefficient of a transform unit of video data has a scan order value that is less than a threshold and when the coefficient is the last significant coefficient in a scan order in the transform unit, the video coding device may execute a function to determine a mapping between data for the coefficient and a codeword index value, and code the data for the coefficient using a codeword associated with the codeword index value. The video coding device may comprise a video encoder or a video decoder, in some examples.

43 Claims, 8 Drawing Sheets

(56) References Cited

U.S. PATENT DOCUMENTS

| | | | |
|---|---|---|---|
| 8,285,064 B2* | 10/2012 | Haddad et al. | 382/250 |
| 9,094,691 B2* | 7/2015 | Zhang | H04N 19/196 |
| 2006/0055571 A1 | 3/2006 | Nagata et al. | |
| 2007/0041653 A1 | 2/2007 | Lafon | |
| 2007/0133676 A1* | 6/2007 | Lee | H04N 19/176 375/240.1 |
| 2008/0165844 A1 | 7/2008 | Karczewicz | |
| 2009/0087109 A1 | 4/2009 | Li et al. | |
| 2009/0232204 A1* | 9/2009 | Lee | H04N 19/176 375/240.02 |
| 2010/0124284 A1* | 5/2010 | Lee | H04N 19/139 375/240.18 |
| 2010/0150226 A1 | 6/2010 | Hallapuro et al. | |
| 2012/0027081 A1* | 2/2012 | Endresen | H04N 19/129 375/240.03 |
| 2012/0027084 A1* | 2/2012 | Zhang | H04N 19/196 375/240.12 |

FOREIGN PATENT DOCUMENTS

| | | |
|---|---|---|
| WO | 2011127423 A1 | 10/2011 |
| WO | 2011130334 A2 | 10/2011 |
| WO | 2012075181 A1 | 6/2012 |
| WO | 2012094234 A1 | 7/2012 |

OTHER PUBLICATIONS

Wang et al., "Context-based entropy coding in AVS video coding standard", Signal Processing: Image Communication, p. 263-276, 2009.*

Wang et al., "Context Based 2D-VLC Entropy Coder in AVS Video Coding Standard", J. Comput. Sci & Technology, vol. 21 No. 3 p. 315-322 May 2006.*

Wang et al., "Context Based 2D-VLC for video coding", IEEE international Conference on Multimedia and Expo, p. 89-92 May 2004.*

"Test Model under Consideration", Joint Collaborative Team on Video Coding (JCT-VC), 2nd Meeting: JCTVC-B205, Geneva, CH, Jul. 21-28, 2010, 152 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Davies, "CAVLC table—size reduction for Inter/chroma run-level coding", 6 Meeting: JCTVC-F160, Turin, IT, Jul. 14-22, 2011, 4pp.

Guo et al., "Run-level Table Reduction for CAVLC", 6th Meeting: JCTVC-F298, Torino, IT, Jul. 14-22, 2011, 3 pp.

International Search Report and Written Opinion—PCT/US2012/040272—ISA/EPO—Aug. 2, 2012, 16 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Karczewicz M., et al: "CE5: coefficient coding with LCEC for large block", Jan. 20-28, 2011, 3 pp.

Karczewicz M et al., "CE5: Improved coefficient coding with LCEC", Document: JCTVC-D374, 4th Meeting: Daegu, KR, Jan. 20-28, 2011, 3 pp.

Ugur et al., "High Performance, Low Complexity Video Coding and the Emerging HEVC Standard", IEEE Transactions on Circuits and Systems for Video Technology, vol. 20, No. Dec. 12, 2010, 10 pp.

Lee et al., "Run-mode coding improvement with table reduction in CAVLC", JCTVC-F407, 6th Meeting: Torino, IT, Jul. 14-22, 2011, 3 pp.

Reed et al., "Efficient Coding of DCT Coefficients by Joint Position-Dependent Encoding", IEEE, US, vol. 5, May 12, 1998. 4 pp.

Ugur, et al., "Description of video coding technology proposal by Tandberg, Nokia, Ericsson", Document: JCTVC-A119, 1st Meeting: Dresden, DE, Apr. 15-23, 2010, 33 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

International Preliminary Report of Patentability from International Application PCT/US2012/040272, dated Dec. 19, 2013, 11 pp.

Schwarz, et al., "Overview of the Scalable Video Coding Extension of the H.264/AVC Standard", IEEE Transactions on Circuits and Systems for Video Technology, IEEE Service Center, Piscataway, NJ, US, vol. 17, No. 9, Sep. 1, 2007, pp. 1103-1120.

Bossen, "Common Test Conditions and Software Reference Configurations", Jan. 20-28, 2011; Joint collaborative Team on Video Coding (JCT-VC) of ITU-T SG16 WP3 and ISO/IEC JTC1/SC29/WG11, JCTVC-E700 WG11 No. m20235, 4th Meeting: Daegu, KR, Feb. 19, 2016, 11 pp.

Karczewicz, et al., "Improvements on VLC", JCT-VC Meeting; MPEG Meeting; Oct. 7-15, 2010; (Joint collaborative Team on Video Coding of ISO/IEC JTC1 /SC29W11 and ITU-T SG 16) No. JCTVC-C263, Oct. 3, 2010, XP030007970, Guangzhou, 5 pp.

Lee, et al., "Efficient coefficient coding method for large transform in VLC mode", Joint Collaborative Team on Video coding (JCT-VC) of ITU-T SG16 WP3 and ISO/IEC JTC1/SC29/WG11, 3rd Meeting: Guangzhou, CN, Oct. 7-15, 2010, JCTVC-C210, 6 pp.

Yasugi, et al., "Simplification of Transform Coefficient Coding in LCEC," Mar. 16-23, 2011; Joint Collaborative Team on Video Coding (JCT VC) of ITU-T SG16 WP3 and ISO/IEC JTC1/SC29/WG11, 5th Meeting Geneva, CH; Mar. 2011, JCTVC-E156, 4 pp.

Wang, et al., "Context-Based 2D-VLC Entropy Coder in AVS Video Coding Standard", Journal of Computer Science and Technology, Kluwer Academic Publishers, BO, vol. 21, No. 3, May 2006, XP019411310, pp. 315-322.

Wiegand, et al., "Overview of the H.264/AVC Video Coding Standard", IEEE Transactions on Circuits and Systems for Video Technology, IEEE Service Center, Piscataway, NJ, US, vol. 13, No. 7, Jul. 1, 2003, XP011221093, pp. 560-576.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

* cited by examiner

RUN-MODE BASED COEFFICIENT CODING FOR VIDEO CODING

This application claims the benefit of U.S. Provisional Application No. 61/493,337, filed Jun. 3, 2011, U.S. Provisional Application No. 61/504,673, filed Jul. 5, 2011, and U.S. Provisional Application No. 61/538,658, filed Sep. 23, 2011 each of which is hereby incorporated by reference in its entirety.

TECHNICAL FIELD

This disclosure relates to video coding, and more particularly, to coding coefficients of a residual block of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

SUMMARY

In general, this disclosure describes techniques for coding coefficients of a block of video data. A block of video data, such as a transform unit (TU), may include a plurality of quantized transform coefficients. A video coding device may code the coefficients using a run-level mode, in which data for non-zero coefficients is jointly coded with a "run" value that describes a number of zero-valued coefficients between the current non-zero coefficient and a subsequent non-zero coefficient in scan order. Specifically, the data for the non-zero coefficients may comprise a value indicative of whether the non-zero coefficient has an absolute value of '1' or more than one, where this data may comprise a levelID value. The video coding device may code the {run, levelID} pair using a codeword, where the codeword may be selected using a codeword mapping table, which provides a codeword index that corresponds to the codeword for the {run, levelID} pair. The codeword may comprise a variable length codeword or a binarized value, which may be further coded using binary arithmetic coding. Typically, coding devices use a two-dimensional look-up table to determine the codeword index, where the dimensions include a position in the scan order of the current non-zero coefficient and the number of zero-valued coefficients in the run to determine the codeword index. This disclosure proposes the use of a one-dimensional table, or a function that approximates such a one-dimensional table, to determine the codeword index for certain positions in the scan.

In one example, a method of coding video data includes, when a coefficient of a transform unit of video data has a scan order value that is less than a threshold and when the coefficient is the last significant coefficient in a scan order in the transform unit: executing a function to determine a mapping between data for the coefficient and a codeword index value, and coding the data for the coefficient using a codeword associated with the codeword index value.

In another example, a device for coding video data includes a video coder configured to, when a coefficient of a transform unit of video data has a scan order value that is less than a threshold and when the coefficient is the last significant coefficient in a scan order in the transform unit, execute a function to determine a mapping between data for the coefficient and a codeword index value and code the data for the coefficient using a codeword associated with the codeword index value.

In another example, a device includes means for executing a function to determine a mapping between data for a coefficient of a transform unit of video data and a codeword index value when the coefficient has a scan order value that is less than a threshold and when the coefficient is the last significant coefficient in a scan order in the transform unit, and means for coding the data for the coefficient using a codeword associated with the codeword index value when the coefficient has the scan order value and when the coefficient is the last significant coefficient in the scan order in the transform unit.

In another example, a computer program product includes a computer-readable medium having stored thereon instructions that, when executed, cause a processor of a device for coding video data to, when a coefficient of a transform unit of video data has a scan order value that is less than a threshold and when the coefficient is the last significant coefficient in a scan order in the transform unit, execute a function to determine a mapping between data for the coefficient and a codeword index value, and code the data for the coefficient using a codeword associated with the codeword index value.

The details of one or more examples are set forth in the accompanying drawings and the description below. Other features, objects, and advantages will be apparent from the description and drawings, and from the claims.

DETAILED DESCRIPTION

Figure 1:
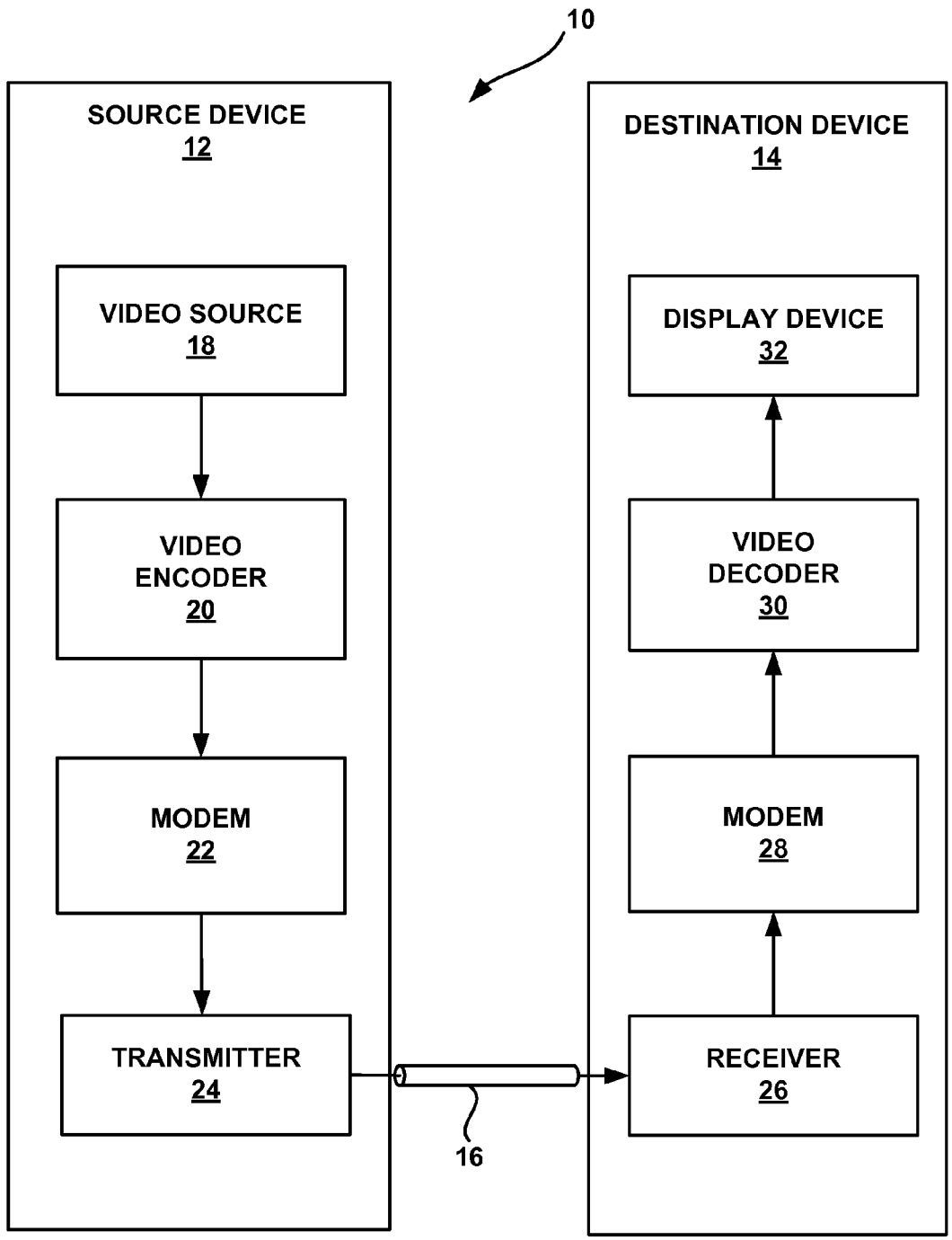
FIG. 1 is a block diagram illustrating an example video encoding and decoding system that may utilize techniques for coding coefficients of blocks of video data.

In general, this disclosure describes techniques for coding coefficients of blocks of video data. Video data includes a sequence of frames (or pictures) played in rapid succession to simulate motion. Each of the frames may be divided into blocks.

Video encoders attempt to compress video data by taking advantage of spatial and temporal redundancy. For example, a video encoder may take advantage of spatial redundancy by coding a block relative to neighboring, previously coded blocks. Likewise, a video encoder may take advantage of temporal redundancy by coding a block relative to data of previously coded frames. In particular, the video encoder may predict a current block from data of a spatial neighbor or from data of a previously coded frame, then may calculate a residual value for the block as a difference between the actual value for the block and the predicted value for the block. The residual for a block includes pixel-by-pixel difference values in the pixel (or spatial) domain.

The video encoder may then apply a transform to the values of the residual (also referred to as a transform unit (TU)) to attempt to compress energy of the values into a relatively small number of coefficients in the transform domain, e.g., a frequency domain. The video encoder may then quantize the transform coefficients. The video encoder may further scan the quantized transform coefficients to convert a two-dimensional matrix of quantized transform coefficients into a one-dimensional vector including the quantized transform coefficients. The process of scanning the coefficients is sometimes referred to as serializing the coefficients.

The video encoder may then apply an entropy coding process to entropy encode the scanned coefficients. Entropy coding generally includes context-adaptive variable length coding (CAVLC) and context-adaptive binary arithmetic coding (CABAC). CAVLC generally includes selection of a variable length codeword (VLC) table, where the codeword table maps values that are to be encoded to variable length codewords. In general, VLC tables are constructed such that symbols or values with higher probabilities are assigned shorter-length codewords, while symbols or values with lower probabilities are assigned longer-length codewords. In CAVLC, coefficients are typically scanned in an order from highest frequency to lowest frequency. In CABAC, data to be coded may first be binarized, forming a binarized value, and the binarized value may then be binary arithmetic coded. A binarization table may provide a mapping between binarized values and data to be binarized (or, alternatively, binarized values and corresponding data, for a decoder).

Rather than coding the value (that is, the level) of the coefficient directly, the video coding device may code a value representative of a pair of values indicative of a number of zero-valued coefficients in the scan between the next non-zero coefficient and the current non-zero coefficient (referred to by the term "run" or "zero run length"), and an indicator of whether the current coefficient has an absolute value equal to one or greater than one (referred to by the term "levelID"). This pair of values may be mapped to a codeword index, referred to as "cn," and the codeword index may correspond to the index of a codeword in a selected table. That is, a codeword mapping table may map the pair {run, levelID} to a codeword index value cn, and the value cn may correspond to a codeword in a table. For example, the value cn may correspond to a VLC codeword in a VLC table or a binarized value in a binarization table.

The video coding device may determine the mapping of the pair {run, levelID} to cn based on a position of the current coefficient in the scan. Let the value k correspond to the number of coefficients between the current coefficient and the last coefficient in reverse scan order (that is, the final coefficient in the reverse scan). Further, let E(run, k) represent a function that returns a value to be used when determining the value of cn for the {run, levelID} pair at position k. Whether to use E(run, k) may be based on whether k is less than a threshold.

This disclosure provides techniques for using a function, rather than a two-dimensional table, for certain special cases. For example, a function may be used for the special case that, for the current coefficient, k is less than the threshold, run=k+1, and levelID=0. Let E1(k) represent such a function. This is a special case in that it corresponds to the last significant (that is, non-zero-valued) coefficient in the reverse scan. The pseudocode below provides an example encoder-based method for using the modified E1(k) function:

```
Encoder:
if (k < T) {
    if (levelID == 0) {
        if (run == k+1)
            cn = E1(k);
        else {
            if (run < E1(k))
                cn = run;
            else
                cn = run+1;
        }
    }
    else if (levelID == 1){
        cn = k + 2 + run;
    }
else if (k>=T) {
    if (levelID==0)
                cn = run;
    else if (levelID==1)
                cn = k + run + 2;
}
```

Implementation and execution of the pseudocode above represents an example of a method of coding (that is, encoding) data, the method including, when a coefficient of a transform unit of video data has a scan order value (k) that is less than a threshold (T) and when the coefficient is the last significant coefficient in a scan order in the transform unit (that is, run==k+1), executing a function (E1(k)) to determine a mapping between data for the coefficient and a codeword index value (cn=E1(k)), and coding the data for the coefficient using a codeword associated with the codeword index value.

The pseudocode below provides an example decoder-based method that is reciprocal to the method discussed above.

```
Decoder:
if (k<T) {
    if(cn >k+1) {
        levelID = 1;
        run = cn − k −2;
    }
```

-continued

```
        else {
            levelID = 0;
            if (cn == E1(k))
                run = k+1
            else if (cn < E1(k))
                run = cn;
            else if (cn > E1(k))
                run = cn-1;
        }
    else if (k>=T) {
            if (cn < k+2) {
                level_ID = 0;
                run = cn;
            }
            else {
                level_ID = 1;
                run = cn - k - 2;
            }
    }
}
```

Implementation and execution of the pseudocode above represents an example of a method of coding (that is, decoding) video data, the method including, when a coefficient of a transform unit of video data has a scan order value (k) that is less than a threshold (T) and when the coefficient is the last significant coefficient in a scan order in the transform unit (cn=E1(k)), executing a function (E1(k)) to determine a mapping between data for the coefficient and a codeword index value (cn), and coding the data for the coefficient using a codeword associated with the codeword index value.

In this manner, both sets of pseudocode above represent examples of a method including, when a coefficient of a transform unit of video data has a scan order value that is less than a threshold and when the coefficient is the last significant coefficient in a scan order in the transform unit: executing a function to determine a mapping between data for the coefficient and a codeword index value, and coding the data for the coefficient using a codeword associated with the codeword index value. That is, both an encoder and a decoder may be configured to perform similar methods for coding {run, levelID} pairs for certain scan order positions, in accordance with the techniques of this disclosure.

In the examples discussed above, E1(k) is used for the special case that, for the current coefficient, run=k+1 and levelID=0. Other special cases may be assigned functions for use in determining the codeword index. For example, let runLeft(k) be defined as the number of coefficients in scan order between the coefficient at scan-order position k and the position to the immediate left of scan-order position k. In other words, if the coefficient at scan-order position k has a position (x, y), runLeft(k) returns the number of coefficients in scan order to reach position (x−1, y). For a given coefficient at scan position k having {run, levelID}, when run is equal to runLeft(k), the function E2(k) may be used to determine a codeword index for {run, levelID}.

Similarly, a function E3(k) may be used to determine a codeword index for {run, levelID} at position k when run is equal to runTop(k), where runTop(k) returns the number of coefficients in scan order to reach a position above the current coefficient position. That is, assuming the current coefficient in scan-order position k has position (x, y), runTop(k) returns the number of coefficients in scan order to reach position (x, y−1).

Rather than using only one threshold, in some examples, two thresholds may be used to determine whether k is within one of three ranges: k<T0, T0<=k<T1, or T1<=k. In this manner, the examples discussed above may be applied (for example, E1(k) may be used) only when T0<=k<T1; otherwise, the conventional method for selecting the codeword index cn may be used.

In the examples above, the threshold(s) may be selected by a user, such as a designer or an administrator, or a video encoder. The selected threshold value(s) may be signaled, e.g., in a picture parameter set (PPS), a slice parameter set (SPS), or an adaptation parameter set (APS). Alternatively, the value(s) of the threshold(s) may be adaptively determined based on side information such as one or more of picture size, picture type, block size, prediction mode (e.g., Inter, Intra), QP (quantization parameter), partition mode (e.g., 2N×2N, N×N), motion vector values, motion vector predictor values. The side information can be the available side information of the current block, or can be the side information from already encoded/decoded blocks.

FIG. 1 is a block diagram illustrating an example video encoding and decoding system 10 that may utilize techniques for coding coefficients of blocks of video data. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless. The techniques of this disclosure, however, which concern coding coefficients of blocks of video data, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for coding coefficients of blocks of video data. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding coefficients of blocks of video data may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to coding coefficients of blocks of video data. The information communicated over channel 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured t retrieve encoded data from a storage medium.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a block or a partition of a block. The video blocks may have fixed or varying sizes, and may differ in size according to a specified coding standard. Each video frame may include a plurality of slices. Each slice may include a plurality of blocks, which may be arranged into partitions, also referred to as sub-blocks.

As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Block sizes that are less than 16 by 16 may be referred to as partitions of a 16 by 16 block. Video blocks may comprise blocks of pixel data in the pixel domain, or blocks of transform coefficients in the transform domain, e.g., following application of a transform such as a discrete cosine transform (DCT), an integer transform, a wavelet transform, or a conceptually similar transform to the residual video block data representing pixel differences between coded video blocks and predictive video blocks. In some cases, a video block may comprise blocks of quantized transform coefficients in the transform domain.

Smaller video blocks can provide better resolution, and may be used for locations of a video frame that include high levels of detail. In general, blocks and the various partitions, sometimes referred to as sub-blocks, may be considered video blocks. In addition, a slice may be considered to be a plurality of video blocks, such as blocks and/or sub-blocks. Each slice may be an independently decodable unit of a video frame. Alternatively, frames themselves may be decodable units, or other portions of a frame may be defined as decodable units. The term "coding unit" may refer to any independently decodable unit of a video frame such as an entire frame, a slice of a frame, a group of pictures (GOP) also referred to as a sequence, or another independently decodable unit defined according to applicable coding techniques.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-four intra-prediction encoding modes.

HEVC refers to a block of video data as a coding unit (CU), which may include one or more prediction units (PUs) and/or one or more transform units (TUs). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample (that is, reference pixel values) for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

A leaf-CU may include one or more transform units (TUs). The transform units may be specified using a TU quadtree structure, as discussed above. That is, a split flag may indicate whether a leaf-CU is split into four transform units. Then, each transform unit may be split further into 4 sub TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the predictive values corresponding to the TU and the original block. The residual value may be transformed, quantized, and scanned. For inter coding, a video encoder may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

In general, this disclosure uses the terms CU and TU to refer to leaf-CU and leaf-TU, respectively, unless noted otherwise. In general, the techniques of this disclosure relate to transforming, quantizing, scanning, and entropy encoding data of a CU. As an example, the techniques of this disclosure include selection of a transform to use to transform a residual value of an intra-predicted block based on an intra-prediction mode used to predict the block. This disclosure also uses the term "directional transform" or "designed transform" to refer to such a transform that depends on intra-prediction mode direction. That is, a video encoder may select a directional transform to apply to a transform unit (TU). As noted above, intra-prediction includes predicting a TU of a current CU of a picture from previously coded CUs and TUs of the same picture. More specifically, a video encoder may intra-predict a current TU of a picture using a particular intra-prediction mode.

Following intra-predictive or inter-predictive coding to produce predictive data and residual data, and following any transforms (such as the 4×4 or 8×8 integer transform used in H.264/AVC or a discrete cosine transform (DCT) or other conceptually similar transform) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. Video encoder 20 may code quantized transform coefficients in a run-mode using VLC. Rather than coding the value of the coefficient directly, the video coding device may code a value representative of a pair of values indicative of a number of zero-valued coefficients in the scan between the last non-zero coefficient and the current coefficient (referred to by the term "run" or "zero run length"), and an indicator of whether the current coefficient has an absolute value equal to one or greater than one (referred to by the term "levelID").

In the HEVC Test Model the mapping between {levelID, run} and codeword number cn is specified for each value of coefficient position k. In the current Test Model (HM 3.0), there are two different methods and the selection between these two methods depends on comparing the current non-zero coefficient location k with a threshold T. The detailed process is as follows:

```
Encoder:
if k<T, then
    cn = E(run,k),        for levelID == 0
    cn = k+E( run,k )+1, for levelID == 1
else if k>=T, then
    cn = run ,            for levelID == 0
    cn = k + run + 2, for levelID == 1
Decoder:
if k < T, then
    if (cn < k+2){
        level_ID = 0;
        run = D(cn);
    }
    else {
        level_ID = 1;
        run = D (cn - k - 1);
    }
else if k>=T, then
    if (cn < k+2){
        level_ID = 0;
        run = cn;
    }
    else {
        level_ID = 1;
        run = cn - k - 2;
    }
```

The current HEVC scheme stores a two-dimensional table E(run,k) at the encoder and a two-dimension table D(run, k) at the decoder for k<T. The size of the table depends on the value of threshold T. When T=28, both encoder and decoder store 434 elements.

In accordance with the techniques of this disclosure, for coefficients at certain scan order positions, video encoder 20 may determine a codeword index, referred to as "cn," and the codeword index may correspond to the index of a codeword in a selected table, e.g., a VLC table or a binarization table. That is, a codeword mapping table may map the pair {run, levelID} to a codeword index value cn, and the value cn may correspond to a codeword in the table, where the codeword may comprise a VLC codeword or a binarized value that may be subsequently binary arithmetic coded.

Video encoder 20 may determine the mapping of the pair {run, levelID} to cn based on a position of the current coefficient in the scan. Let the value k correspond to the number of coefficients between the current coefficient and the last coefficient in reverse scan order (that is, the final coefficient in the reverse scan). Further, let E(run, k) represent a function that returns a value to be used when determining the value of cn for the {run, levelID} pair at position k. Whether to use E(run, k) may be based on whether k is less than a threshold.

This disclosure provides techniques for using a function, rather than a two-dimensional table, for certain special cases. For example, video encoder 20 may execute a function for the special case that, for the current coefficient, k is less than the threshold, run=k+1, and levelID=0. Let E1(k) represent such a function. This is a special case in that it corresponds to the last significant (that is, non-zero-valued) coefficient in the reverse scan. The pseudocode below provides an example encoder-based method for using the modified E1(k) function:

```
Encoder:
if (k < T) {
    if (levelID == 0) {
        if (run == k+1)
            cn = E1(k);
        else {
            if (run < E1(k))
                cn = run;
            else
                cn = run+1;
        }
    }
    else if (levelID == 1){
        cn = k + 2 + run;
    }
else if (k>=T) {
    if (levelID==0) cn = run;
    else if (levelID==1) cn = k + run + 2;
}
```

In this manner, video encoder 20 represents an example of a coding device configured to, when a coefficient of a transform unit of video data has a scan order value that is less than a threshold and when the coefficient is the last significant coefficient in a scan order in the transform unit, execute a function to determine a mapping between data for the coefficient and a codeword index value, and code the data for the coefficient using a codeword associated with the codeword index value.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video decoder 30 may be configured to perform a similar method to that described above for decoding quantized transform coefficients. For example, video decoder 30 may perform a method in accordance with the following pseudocode:

```
Decoder:
    if (k<T) {
        if(cn >k+1) {
            levelID = 1;
            run = cn - k -2;
        }
        else {
            levelID = 0;
            if (cn == E1(k))
                run = k+1
            else if (cn < E1(k))
                run = cn;
            else if (cn > E1(k))
                run = cn-1;
        }
    else if (k>=T) {
        if (cn < k+2) {
            level_ID = 0;
            run = cn;
        }
        else {
            level_ID = 1;
            run = cn - k - 2;
        }
    }
}
```

In this manner, video decoder 30 also represents an example of a coding device configured to, when a coefficient of a transform unit of video data has a scan order value that is less than a threshold and when the coefficient is the last significant coefficient in a scan order in the transform unit, execute a function to determine a mapping between data for the coefficient and a codeword index value, and code the data for the coefficient using a codeword associated with the codeword index value.

In some examples, a mapping between cn and {run, levelID} for k<T may be determined based on the techniques described above, e.g., using a function or one-dimensional table for certain positions. The mapping for k>=T can be determined in the same manner as for conventional HEVC, in some examples.

According to some examples, codeword numbers are derived based on the following rules:

1. cn (run_i, levelID = 0) < cn (run_j, levelID = 1), for any possible i,j.
2. Except the case of run=k+1, cn(run_i, levelID) > cn(run_j, levelID) if i > j.

With the two rules above, rule 1 indicates that every run associated with a levelID of 0 is assigned a code number that is smaller than the code number for any run associated with a levelID of 1.

Run2 may be performed such that given the levelID value, a shorter run is assigned a code number that is smaller than the code number for a longer run, except for the case of a run having a value of k+1.

It can be seen that based on the two rules, the code number for each {run, levelID} is determined, depending on what code number is assigned to the case of a run having a value of k+1. Due to the high likelihood of occurrence of the case with a run having a value of k+1, code number assignment based on run value is found not so optimal for this case. A special code number may be provided for this case based on value k (i.e., the current coefficient position).

According to some examples, in assigning code number to each {run, levelID} pair, only the case of a run having a value of k+1 needs a special code number, while for other cases the assignment of a code number follow the two rules 1 and 2 above.

According to some examples, code numbers for the case of a run having a value of k+1 can be saved in a one-dimensional table E1(k). When T=28, there are 28 elements that are stored. It should be noted that saving these special code numbers into a table is just one example. In some examples, the value of E1(k) may also be obtained through a formula, such that there is no need to explicitly store the elements of E1(k).

The decoding rule can be simply derived based on the above two encoding rules and mapping table E1(k). The size of table E1(k) is T. When T=28, there are only 28 elements that are stored. Again, in some examples, the value of E1(k) may also be obtained through a formula, such that there is no need to explicitly store the elements of E1(k).

The details of encoding and the decoding process can be described as follows:

At the encoder side, with the help of the E1(k) function and the predefined two rules, the code number cn can be derived by video encoder 20 as follows: (based on E1(k), run, levelID and position index value k), in accordance with the encoder pseudocode above, which is reprinted below.

```
Encoder:
    if (k < T)
    {
        if (levelID == 0)
        {
            if (run == k +1)
                cn = E1(k);
            else
            {
                if (run < E1(k))
                    cn = run;
                else
                    cn = run+1;
            }
        }
        else if (levelID == 1)
        {
            cn = k + 2 + run;
        }
    }
    else if (k>=T)
    {
        ...
    }
```

At the decoder side, reciprocal operations as follows can be performed to derive run and levelID values based on values of code number cn and position index value k of the current coefficient by video decoder 30, in accordance with the decoder psedocode above, which is reprinted below.

```
Decoder:
    if (k<T)
    {
        if(cn >k+1)
        {
            levelID = 1;
```

```
            run = cn - k -2;
        }
        else
        {
            levelID = 0;
            if (cn == E1(k))
                run = k+1
            else if (cn < E1(k))
                run = cn;
            else if (cn > E1(k))
                run = cn-1;
        }
    else if (k>=T)
    {
    ...
    }
```

As another example, the methods described above may be applied to T1>k>=T0 (Example 1 is a special case when T0=T and T1=0). Different methods are used when k<T0 or k>=T1. T1 and T0 represent different threshold values, in this example. Video encoder 20 may perform a method according to the following example pseudocode:

```
Encoder:
    if (k < T0)
    {
            cn = E(run,k),      for levelID == 0
            cn = k+E( run,k )+1, for levelID == 1
    }
    else
        if (T1>k>=T0)
        {
            if (levelID == 0)
            {
                if (run == k +1)
                    cn = E1(k);
                else
                {
                    if (run < E1(k))
                        cn = run;
                    else
                        cn = run+1;
                }
            }
            else if (levelID == 1)
            {
                cn = k + 2 + run;
            }
        }
    else if (k>=T1)
    {
    ...
    }
```

Video decoder 30 may be configured to perform a similar, albeit reciprocal, method.

As yet another example, the values of T0 and/or T1 and/or one-dimension mapping Table E1(k) are selected by the user or the encoder, and the selected values are transmitted to the decoder as overhead information. For example, they can be transmitted in a PPS (picture parameter set), a SPS (slice parameter set), or an APS (adaptation parameter set).

In some examples, the values of T0 and/or T1 and/or one-dimension mapping Table E1(k) can be adaptively determined based on side information, such as picture size, picture type, block size, prediction mode (e.g., Inter, Intra), QP (quantization parameter), partition mode (e.g., 2N×2N, N×N), motion vector values, motion vector predictor values. The side information can be the available side information of the current block, or can be the side information from already encoded/decoded blocks.

Figure 4:
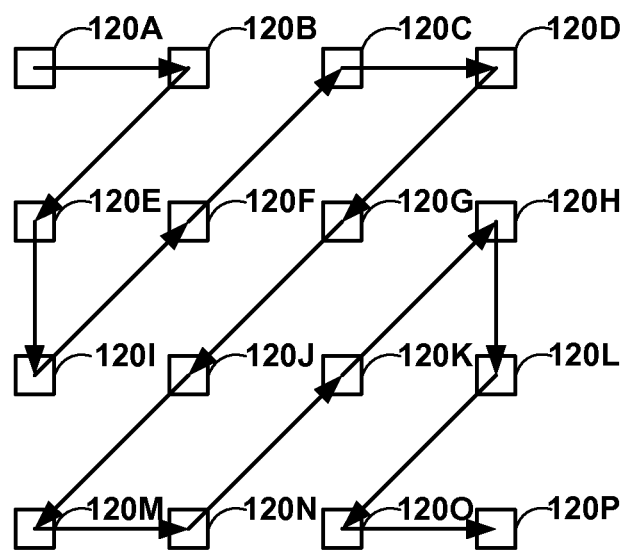
FIG. 4 is a conceptual diagram illustrating an example zig-zag scan of coefficients of a block of video data.

In some examples, a one-dimension Table E2(k) is used to specify the mapping between cn and (run, levelID)=(run0, lev0). Some example values of run0 are run_l, run_t and k+1, where run_l is corresponding to the left location of the previous non-zero coefficient in the reverse zigzan scan, and run_t is corresponding to the top location of the previous coefficient. FIG. 4, described in greater detail below, provides examples of the scan and these positions. For example, in the 4×4 block, when k=7, the previous coefficient is at location 8 (102J in FIG. 4). The left location of location 8 is location 3 (102I in FIG. 4), which corresponds to run=4, thus run_t=4. The top location of location 8 is location 4 (102F in FIG. 4), which corresponds to run=3, thus run_t=3. The encoder uses mapping table E2(k) to map (run, levelID) to code number cn, and the decoder performs the inverse mapping.

In some examples, several one-dimensional Tables E1(k) are used to define the mapping between (run, levelID) and cn. For example, E1(k) defines the mapping between cn and (run, levelID)=(k+1, 0); E2(k) defines the mapping between cn (run, levelID)=(run_l, 0), and E3(k) defines the mapping between (run, levelID)=(run_t, 0). For other (run, levelID), their mapping to cn can be define using other methods.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Using a function or one-dimensional table to determine the codeword index for certain {run, levelID} pairs, e.g., based on certain positions in the scan order, may provide various benefits. For example, replacing a two-dimensional table with a one-dimensional table or a function may reduce memory storage requirements of a video coding device. Lookups of codeword index values may be performed faster using a function or one-dimensional table than a two-dimensional table, in some examples.

Figure 2:
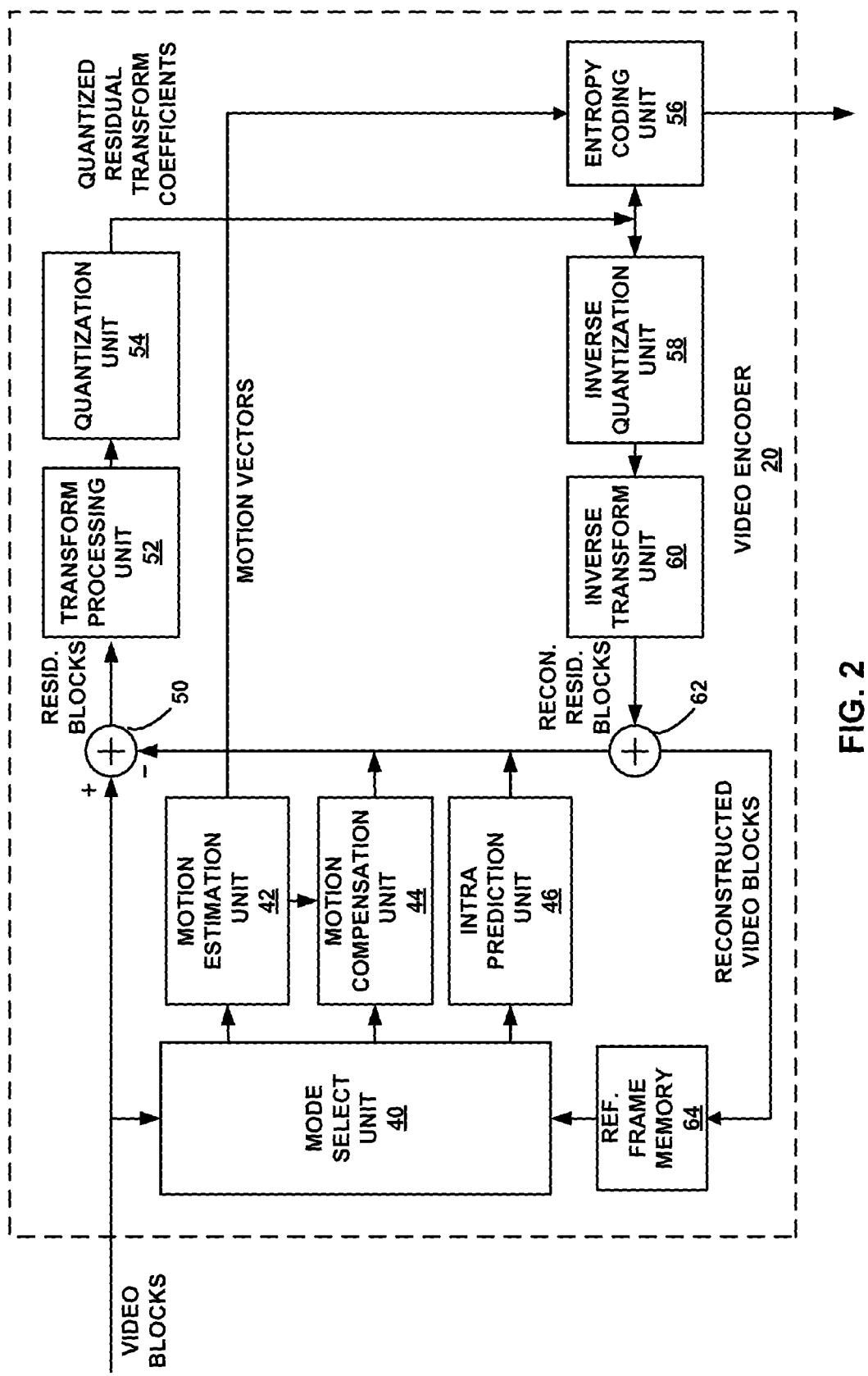
FIG. 2 is a block diagram illustrating an example of video encoder that may implement techniques for coding coefficients of blocks of video data.

FIG. 2 is a block diagram illustrating an example of video encoder 20 that may implement techniques for coding coefficients of blocks of video data. Video encoder 20 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

A typical video encoder partitions each frame of the original video sequence into contiguous rectangular regions called "blocks." These blocks are encoded in "intra mode" (I-mode), or in "inter mode" (P-mode or B-mode).

For P-mode, the encoder (and more particularly, motion estimation unit 42) may first search for a block similar to the one being encoded in a previously coded "reference frame,"

denoted $F_{ref}$. Searches are generally restricted to being no more than a certain spatial displacement from the block to be encoded. When the best match, or "prediction," has been identified, it is expressed in the form of a two-dimensional (2D) motion vector ($\Delta x$, $\Delta y$) where $\Delta x$ is the horizontal and $\Delta y$ is the vertical displacement. The motion vectors together with the reference frame may be used to construct predicted block $F_{pred}$:

$$F_{pred}(x,y)=F_{ref}(x+\Delta x,y+\Delta y)$$

The location of a pixel within the frame is denoted by (x, y).

For blocks encoded in I-mode, the predicted block is formed using spatial prediction from previously encoded neighboring blocks within the same frame. Intra prediction unit 46 of video encoder 20 may encode blocks in I-mode.

For both I-mode and P-mode, the prediction error, i.e. the difference between the block being encoded and the predicted block, is represented as a set of weighted basis functions of some discrete transform. Transforms are typically performed on an 32×32, 16×16, 8×8 or 4×4 block basis, e.g., by transform processing unit 52. Other transforms like 32×16/16×32, 32×8/8×32 . . . are also possible. The weights—transform coefficients—are subsequently quantized, e.g., by quantization unit 54. Quantization introduces loss of information, thus quantized coefficients have lower precision than the original ones.

Quantized transform coefficients and motion vectors are examples of "syntax elements." These, plus some control information, form a complete coded representation of the video sequence. Prior to transmission from the encoder to the decoder, all syntax elements are entropy coded, e.g., by entropy coding unit 56, thereby further reducing the number of bits needed for their representation. Entropy coding is a lossless operation aimed at minimizing the number of bits required to represent transmitted or stored symbols (syntax elements) by utilizing properties of their distribution (some symbols occur more frequently than others).

One method of entropy coding employed by video coders is Variable Length Codes (VLC). In case of VLC coding, each of the coded symbols may first be assigned a codeword number. When there are n symbols to be coded each one may have a codeword number assigned ranging from 0 to n−1. Subsequently to each of these codeword numbers a codeword is assigned (string of 0s and 1s). Shorter codewords may be assigned to symbols having higher probability. Moreover, the codewords have to be uniquely decodable, i.e., if the decoder receives a valid sequence of bits of a finite length, there must be only one possible sequence of input symbols that, when encoded, would have produced the received sequence of bits.

Another method of entropy coding is context-adaptive binary arithmetic coding (CABAC). In CABAC, values to be encoded, such as transform coefficients or {run, levelID} pairs, may be assigned binarized values. The binarized values may then be arithmetic coded. In accordance with the techniques of this disclosure, codewords may correspond to binarized values. Thus, video encoder 20 may determine a binarized value for a coefficient by determining a codeword index for the binarized value. Thus, references to determining a codeword in this disclosure should be understood to include both determination of VLC codewords and determination of binarized values, which may be further coded using, e.g., arithmetic coding such as CABAC.

To correctly decode the bitstream, both the encoder and the decoder use the same set (e.g., same table) of codewords and the same assignment of symbols to the codewords. As it was mentioned before, to maximize the compression, the most frequently occurring symbols should be assigned the shortest codewords. However the frequency (probability) of different symbols may change depending on the type of the encoded image. Using a single set of codewords and a single assignment of symbols to those codewords (mapping of the symbols to the codeword numbers) would therefore reduce coding efficiency.

To rectify this problem, different methods of adaptation are used. For a set of symbols, a number of sets of codewords may be available. Which of these sets is used may depend on the information known both to the encoder and decoder such as type of the coded block (I-, P-, or B-type block), component (luma or chroma) or QP value. The performance depends on how well the parameters used to switch between the codewords characterize the symbol statistic.

The compression ratio, i.e., the ratio of the number of bits used to represent original sequence and the compressed one, may be controlled by adjusting the value of the quantization parameter (QP) used when quantizing transform coefficients. The compression ratio also depends on the method of entropy coding employed. In some examples, mode select unit 40 determines the QP to use by performing multiple coding passes, each pass using a different QP, and selects the QP that best balances the number of bits used to code video data and the amount of distortion introduced into the video data, e.g., in a process referred to as rate-distortion optimization (RDO).

As shown in FIG. 2, video encoder 20 receives a current video block within a video frame to be encoded. In the example of FIG. 2, video encoder 20 includes motion compensation unit 44, motion estimation unit 42, reference frame memory 64, summer 50, transform processing unit 52, quantization unit 54, and entropy coding unit 56. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may also perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. As explained above, mode select unit 40 may use rate-distortion optimization to select an appropriate coding mode, along with other coding characteristics, such as QP.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. The ITU H.264 standard, as an example, describes two lists: list 0, which includes reference frames having a display order earlier than a current frame being encoded, and list 1, which includes reference frames having a display order later than the current frame being encoded. Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT.

Wavelet transforms, integer transforms, sub-band transforms or other types of transforms could also be used. In any case, transform processing unit 52 applies the transform to the residual block, producing a block of residual transform coefficients. The transform may convert the residual information from a pixel domain (also referred to as a spatial domain) to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based on neighboring macroblocks.

In accordance with the techniques of this disclosure, entropy coding unit 56 may be configured to execute a function to determine a mapping between data for a coefficient (that is, a quantized transform coefficient) and a codeword index value. For example, for VLC, entropy coding unit 56 may determine a VLC codeword for a coefficient. As another example, for CABAC, entropy coding unit 56 may determine a binarized value for a coefficient, and may further entropy encode the binarized value. In this manner, for CABAC, the binarized value may correspond to the codeword. In particular, when coding using CABAC, entropy coding unit 56 may determine a binarized value corresponding to a codeword index value, in a manner similar to the description of determining a codeword that corresponds to the codeword index value in VLC.

Entropy coding unit 56 may code {run, levelID} pairs using the techniques of this disclosure. For example, entropy coding unit 56 may be configured to perform according to the Encoder pseudocode described above. That is, for some coefficients, entropy coding unit 56 may be configured to execute a function to determine a mapping between a codeword index value and data for a current coefficient. For example, entropy coding unit 56 may execute the function when the coefficient has a scan order value that is less than a threshold and when the coefficient is the last significant coefficient in a scan order in the transform unit.

As another example, entropy coding unit 56 may execute a different function for a coefficient having a {run, levelID} pair such that the run value is equal to a number of coefficients in the scan order to reach a second coefficient that is left of the first coefficient in the transform unit, and when the second coefficient has an absolute value greater than zero. As yet another example, entropy coding unit 56 may execute yet a different function for a coefficient having a {run, levelID} pair such that the run value is equal to a number of coefficients in the scan order to reach a second coefficient that is above the first coefficient in the transform unit, and when the second coefficient has an absolute value greater than zero. Examples of coefficients above and to the left of a current coefficient are described in greater detail with respect to FIG. 4, below.

Furthermore, in some examples, entropy coding unit 56 may be configured to execute a function to determine a mapping between data for a coefficient and a codeword index value when a scan order value of the coefficient is between two threshold values. That is, entropy coding unit 56 may execute the function to determine the mapping when the scan order value is less than a first threshold and greater than a second threshold, where the second threshold is less than the first threshold. For example, assume that $T_1$ represents the first threshold value, $T_2$ represents the second threshold value, and k represents the scan order value of a coefficient. Entropy coding unit 56 may be configured to execute the function to determine the mapping when $T_2 < k < T_1$. Entropy coding unit 56, or another unit of video encoder 20, may be configured to code signaling data representative of the first and/or second threshold values in a parameter set, such as a sequence parameter set (SPS), picture parameter set (PPS), adaptation parameter set (APS), slice header, frame header, sequence header, or other data structure. Likewise, video encoder 20 may code signaling data representative of the value of a threshold where only one threshold is used to determine whether to determine a mapping between data for a coefficient and a codeword index value.

Where entropy coding unit 56 is configured to code data using CAVLC, entropy coding unit 56 may use the codeword index value to select a VLC codeword from a VLC table. For example, the VLC table may include codewords arranged according to a particular order (e.g., shortest to longest), and the codeword index value may correspond to an entry in the VLC table. For example, assuming that the codeword index value is n, entropy coding unit 56 may select the $n^{th}$ VLC codeword from the VLC table.

Where entropy coding unit 56 is configured to code data using CABAC, entropy coding unit 56 may use the codeword index value to select a binarized value to be coded using CABAC. For example, entropy coding unit 56 may select a binarized value from a binarization table, in a manner similar to the selection of a VLC codeword described above. Thus, assuming that the codeword index value is n, entropy coding unit 56 may select the $n^{th}$ binarized value from the binarization table. Moreover, entropy coding unit 56 may encode the binarized value using arithmetic coding, in accordance with CABAC. That is, entropy coding unit 56 may initialize a context for coding the current syntax element to determine a current context state, then code each bit of the binarized value (where bits are referred to as "bins" in CABAC). After coding each bin of the binarized value, entropy coding unit 56 may update the current context state based on the value of the most recently coded bin.

In some cases, entropy coding unit 56 or another unit of video encoder 20 may be configured to perform other coding functions, in addition to entropy coding. For example, entropy coding unit 56 may be configured to determine the CBP values for the macroblocks and partitions. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In this manner, video encoder 20 represents an example of a video coder configured to, when a coefficient of a transform unit of video data has a scan order value that is less than a threshold and when the coefficient is the last significant coefficient in a scan order in the transform unit, execute a function to determine a mapping between data for the coefficient and a codeword index value and code the data for the coefficient using a codeword associated with the codeword index value. In particular, in this example, the video coder is a video encoder. To code the data for the coefficient, video encoder 20 may be configured to encode a {run, levelID} pair for the coefficient using the codeword during a video encoding process. Likewise, the codeword may comprise a binarized value, and to code the data, video encoder 20 may be configured to code the binarized value using context adaptive binary arithmetic coding (CABAC).

Figure 3:
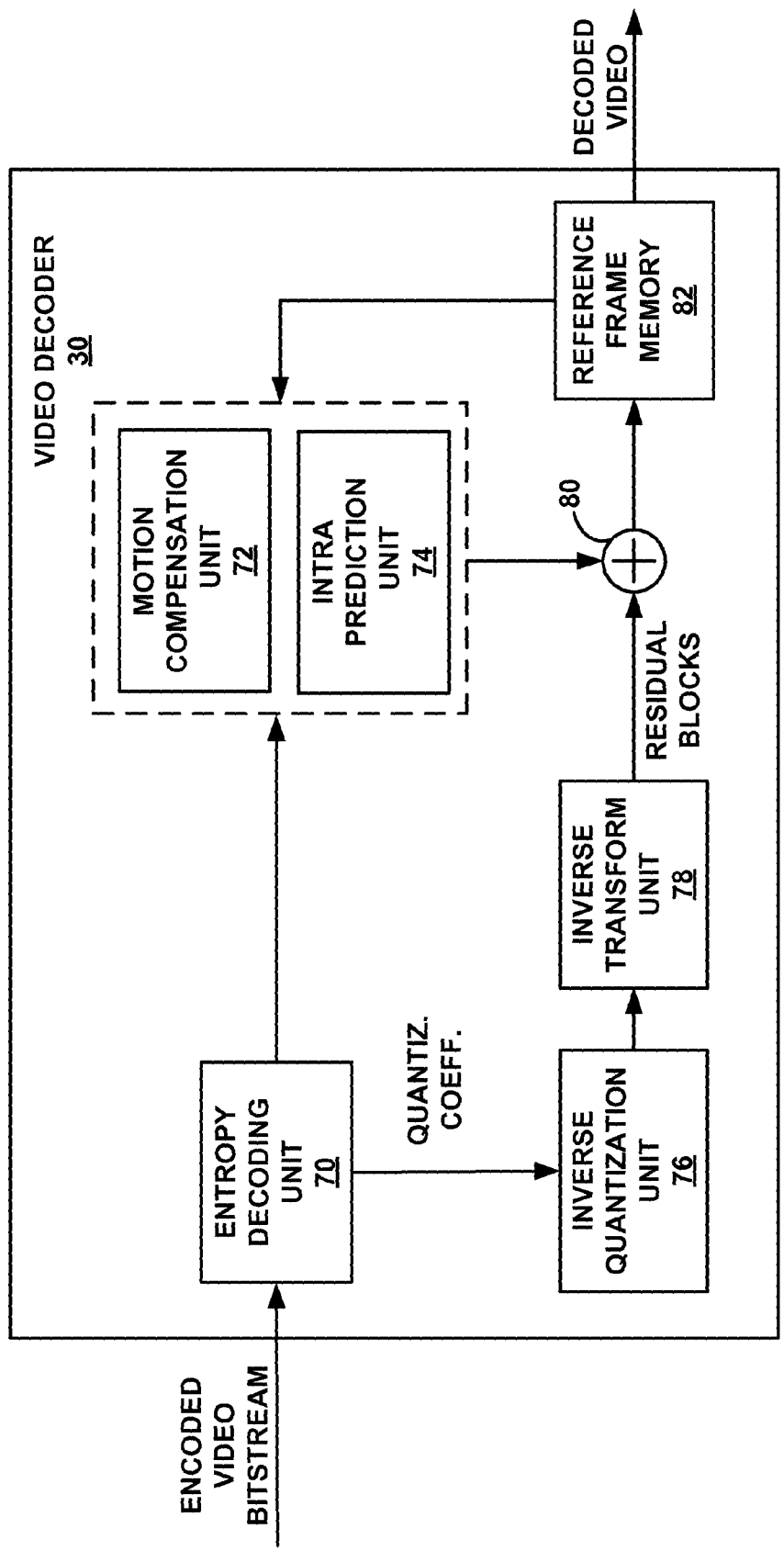
FIG. 3 is a block diagram illustrating an example of a video decoder that may implement techniques for coding coefficients of blocks of video data.

FIG. 3 is a block diagram illustrating an example of video decoder 30 that may implement techniques for coding coefficients of blocks of video data. In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

In accordance with the techniques of this disclosure, entropy decoding unit 70 may decode codeword index values corresponding to data for a current coefficient, e.g., a {run, levelID} pair for the current coefficient. For example, in CAVLC, entropy decoding unit 70 may receive a VLC codeword and determine the codeword index value from a VLC table. As another example, in CABAC, entropy decoding unit 70 may decode CABAC-encoded data to reproduce a binarized value. That is, entropy decoding unit 70 may reproduce the binarized value bit-by-bit (or bin-by-bin) by transitioning through context states, similar to the transitions described above with respect to entropy coding unit 56, and determining the value of the current bit based on the current state and a current value being decoded. In this manner, entropy decoding unit 70 may reproduce the binarized value. Entropy decoding unit 70 may then determine a codeword index value of the binarized value from a binarization table.

In any case, after determining a codeword (e.g., a VLC codeword or a binarized value) for data of a current coefficient, in some examples, entropy decoding unit 70 may use a function to determine a mapping between the codeword index value and the data, e.g., the {run, levelID} pair. For example, entropy decoding unit 70 may execute a function to determine the mapping when a coefficient of a transform unit of video data has a scan order value that is less than a threshold and when the coefficient is the last significant coefficient in a scan order in the transform unit.

As another example, entropy decoding unit 70 may execute a different function for a coefficient to determine whether the coefficient has a {run, levelID} pair such that the run value is equal to a number of coefficients in the scan order to reach a second coefficient that is left of the first coefficient in the transform unit, and when the second coefficient has an absolute value greater than zero. As yet another example, entropy decoding unit 70 may execute yet a different function for a coefficient to determine whether the coefficient has a {run, levelID} pair such that the run value is equal to a number of coefficients in the scan order to reach a second coefficient that is above the first coefficient in the transform unit, and when the second coefficient has an absolute value greater than zero.

Furthermore, in some examples, entropy decoding unit 70 may be configured to execute a function to determine a mapping between data for a coefficient and a codeword index value when a scan order value of the coefficient is between two threshold values. That is, entropy decoding unit 70 may execute the function to determine the mapping when the scan order value is less than a first threshold and greater than a second threshold, where the second threshold is less than the first threshold. For example, assume that $T_1$ represents the first threshold value, $T_2$ represents the second threshold value, and k represents the scan order value of a coefficient. Entropy decoding unit 70 may be configured to execute the function to determine the mapping when $T_2 \leq k \leq T_1$. Entropy decoding unit 70, or another unit of video decoder 30, may be configured to code (that is, decode) signaling data representative of the first and/or second threshold values in a parameter set, such as a sequence parameter set (SPS), picture parameter set (PPS), adaptation parameter set (APS), slice header, frame header, sequence header, or other data structure. Likewise, video decoder 30 may code signaling data representative of the value of a threshold where only one threshold is used to determine whether to determine a mapping between data for a coefficient and a codeword index value. That is, video decoder 30 may receive such a data structure and decode the data structure, to determine the value(s) of the threshold(s).

In this manner, video decoder 30 may determine pairs of {run, levelID} values for a current coefficient of a transform unit. Video decoder 30 may further decode other syntax data for the coefficient (e.g., actual level values), and thereby reconstruct the transform unit. For example, when the levelID value indicates that the coefficient has an absolute value greater than one, video decoder 30 may decode additional syntax data indicating the actual value of the coefficient. By performing this for each coefficient of the transform unit, placing level values for non-zero valued coefficients in order following the runs of zeroes according to the scan order, video decoder 30 may reproduce a transform unit for a current coding unit. Moreover, inverse quantization unit 76 may inverse quantize the transform unit, and inverse transform unit 78 may inverse transform the transform unit, to reproduce residual values in the spatial domain.

In video decoder 30, the block in the current frame is obtained by first constructing its prediction in the same manner as in the encoder, and by adding to the prediction the compressed prediction error. The compressed prediction error is found by weighting the transform basis functions using the quantized coefficients. The difference between the reconstructed frame and the original frame is called reconstruction error.

Motion compensation unit 72 may use motion vectors received in the bitstream to identify a prediction block in reference frames in reference frame memory 82. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each macroblock to determine a degree of quantization and, likewise, a degree of inverse quantization that should be applied.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Motion compensation unit 72 uses some of the syntax information to determine sizes of macroblocks used to encode frame(s) of the encoded video sequence, partition information that describes how each macroblock of a frame of the encoded video sequence is partitioned, modes indicating how each partition is encoded, one or more reference frames (and reference frame lists) for each inter-encoded macroblock or partition, and other information to decode the encoded video sequence.

Summer 80 sums the residual blocks with the corresponding prediction blocks generated by motion compensation unit 72 or intra-prediction unit to form decoded blocks. If desired, a deblocking filter may also be applied to filter the decoded blocks in order to remove blockiness artifacts. The decoded video blocks are then stored in reference frame memory 82, which provides reference blocks for subsequent motion compensation and also produces decoded video for presentation on a display device (such as display device 32 of FIG. 1).

Video decoder 30 may be configured to perform any or all of the techniques of this disclosure, such as using a function or a one-dimensional table to decode a received coefficient of a TU. Video decoder 30 may be configured to implement the decoder pseudocode discussed above, or reciprocal methods to encoder pseudocode, as discussed above.

In this manner, video decoder 30 represents an example of a video coder configured to, when a coefficient of a transform unit of video data has a scan order value that is less than a threshold and when the coefficient is the last significant coefficient in a scan order in the transform unit, execute a function to determine a mapping between data for the coefficient and a codeword index value and code the data for the coefficient using a codeword associated with the codeword index value. In particular, in this example, the video coder is a video decoder. To code the data for the coefficient, video decoder 30 may be configured to determine a {run, levelID} pair for the coefficient using the codeword. Moreover, video decoder 30 may be configured to execute the function after decoding the codeword to determine the data for the coefficient from the codeword index value.

FIG. 4 is a conceptual diagram illustrating an example zig-zag scan of coefficients 120A-120P (coefficients 120). Although FIG. 4 illustrates an example of a 4×4 block, other block sizes are also possible. Coefficients 120 generally correspond to quantized transform coefficients, resulting from transformation and quantization of pixels of a TU. In this example, the zig-zag scan starts at coefficient 120A, then proceeds to coefficient 120B, then to coefficient 120E, then to coefficient 120I, then to coefficient 120F, then to coefficient 120C, then to coefficient 120D, then to coefficient 120G, then to coefficient 120J, then to coefficient 120M, then to coefficient 120N, then to coefficient 120K, then to coefficient 120H, then to coefficient 120L, then to coefficient 120O, and finally to coefficient 120P.

By performing this scan, the two-dimensional arrangement of coefficients for pixels may be converted into a one-dimensional array including values for each of coefficients 120. These values may be arranged in the array in the order of the scan. For example, the value for coefficient 120A may be first in the array, followed by values for coefficients 120B, 120E, 120I, 120F, and so on.

Coefficients in a given block are arranged in a certain order (scan), resulting in a one-dimensional ordered coefficient vector. One widely used scan is zigzag scan. An example zigzag scan for a 4×4 block appears in FIG. 4. There also can be some other scans, like horizontal scan, vertical scan, wavefront scan. In this disclosure, zig-zag scan is used to explain proposed schemes. It should be understood that the proposed schemes of this disclosure can also work with other scans.

Zigzag scan presumes that after applying 2 dimensional (2D) transform the transform coefficients having most energy (i.e. higher value coefficients) correspond to low frequency transform functions and are located towards the top-left of the block as it is depicted in FIG. 4. Conversely, higher frequency, lower energy transform coefficients reside toward the lower right of the block. Hence, in a coefficient vector produced through zigzag scanning, the higher magnitude coefficients will most likely appear towards the start of the vector. After quantization most of the low energy coefficients becomes equal to 0. It is also possible to adapt the coefficient scan during the coefficient coding. For example, lower number in the scan may be assigned to those positions for which non-zero coefficients happen more often.

Entropy encoding a single 4×4 block using VLC in HEVC Test Model involves the following steps, as an example:
1. Encoding position of the last nonzero coefficient in the scan combined with levelID which indicates whether absolute value |level| of this coefficient is 1 or >1. The remaining coefficients of the 4×4 block are coded in inverse scan order and are coded in Run-Mode or Level Mode. The procedure to switch from Run-Mode to Level-Mode is decided based on magnitudes of the coefficients that were already coded.
2. Run-Mode Coding. In this mode, the number of zero coefficients is signaled starting from the previous non-zero coefficient. The syntax element is LevelOne_run jointly codes run and levelID. Value of run is equal to the number of zero coefficients between the current nonzero coefficient and the next non-zero coefficient in the inverse scan order, while levelID indicates whether |level| of the next non-zero coefficient is 1 or >1. If the current nonzero coefficient is in position k, run values can be in the range from 0 to k. Run value equal to k means that there are no more nonzero coefficients in this blocks. The mapping between {levelID, run} and codeword number cn is dependent on value k.
3. Level Mode Coding. The value of |level| is decoded using VLCx, where x is 0 for the first coefficient that is being coded in Level-Mode. After level-Mode decoding of each coefficient, if |level|>vlc_level_table[x] then the VLC table index, x, is incremented by one.

A similar process may be performed when coding {run, levelID} pairs using CABAC. However, as noted in this disclosure, rather than selecting VLC codewords, a video coder may select binarized values and then further binary arithmetic code the binarized values, when coding syntax elements using CABAC.

As noted above, one-dimensional tables and equations that approximate one-dimensional tables may be provided for one or more special positions in the scan order. For VLC, run-mode coding may be performed in a reverse scan order, e.g., from coefficient 120P to coefficient 120A. Therefore, coefficient 120A may be treated as the "last" coefficient in scan order for the purpose of run-mode coding, that is, when coding {run, levelID} pairs. As noted above, one example of a special position in scan order is a position for which the value k is less than a threshold and for which run is equal to k+1. For example, if coefficient 120D were the last coefficient in inverse scan order, coefficient 120D may have a run value of 6 and a k value of 7. Accordingly, video encoder 20 or video decoder 30 may use a one-dimensional table or a function to determine a mapping between a codeword index and the {run, levelID} pair for coefficient 120D.

As discussed above, other positions may be considered special positions for which one-dimensional tables or functions may be provided. Examples of other special positions include run_l and run_t. As an example, coefficient 120G may be considered to be in a run_l position when coefficients 120D and 120C are zero-valued and coefficient 120F has a non-zero value. As discussed above, a run_l position, also referred to as a "run left" or "runLeft(k)" position, is a position to the immediate left of a current position, such that all coefficients in scan order between the current position and the run_l position are zero-valued. As another example, coefficient 120G may be alternatively considered to be in a run_t position when coefficient 120D is zero-valued and coefficient 120C has a non-zero value. As discussed above, a run_t position, also referred to as a "run top" or "runTop(k)" position, is a position immediately above a current position, such that all coefficients in scan order between the current position and the run_t position are zero-valued.

Figure 5:
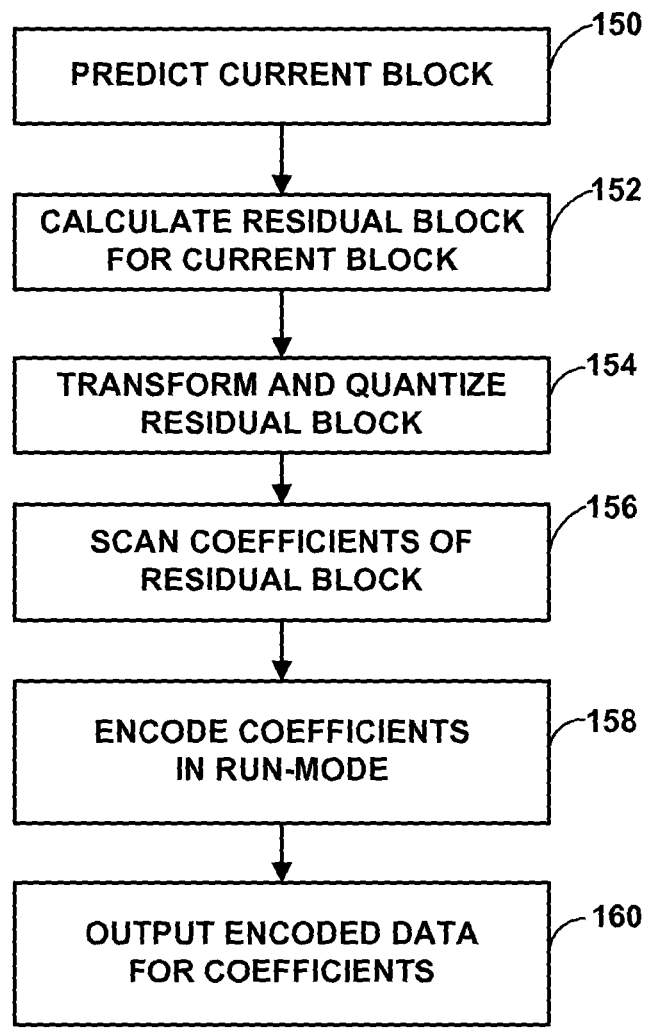
FIG. 5 is a flowchart illustrating an example method for encoding a current block.

FIG. 5 is a flowchart illustrating an example method for encoding a current block. The current block may comprise a current CU or a portion of the current CU. Although described with respect to video encoder 20 (FIGS. 1 and 2), it should be understood that other devices may be configured to perform a similar method.

In this example, video encoder 20 initially predicts the current block (150). For example, video encoder 20 may calculate pixel values for one or more prediction units (PUs) for the current block. For example, motion estimation unit 42 may calculate a motion vector for a PU that points to a reference block in a previously coded picture, and motion compensation unit 44 may extract pixel values from the reference block to be used as the pixel values for the prediction unit. Alternatively, intra prediction unit 46 may calculate predicted pixel values using intra prediction.

Video encoder 20 may then calculate a residual block for the current block, e.g., to produce a transform unit (TU) (152). To calculate the residual block, video encoder 20 may calculate a difference between the original, uncoded block and the predicted block for the current block. For example, summer 50 may calculate the differences between the pixel values for the original block and collocated predicted pixel values. Video encoder 20 may then transform and quantize coefficients of the residual block (154). This may yield a transform unit including quantized transform coefficients.

Next, video encoder 20 may scan the quantized transform coefficients of the transform unit (156). During the scan, or following the scan, video encoder 20 may encode the coefficients in run-mode (158). For example, video encoder 20 may determine codewords, such as VLC codewords or binarized values, representative of {run, levelID} pairs for the coefficients. For VLC coding, video encoder 20 may code the {run, levelID} pair using a VLC codeword corresponding to a codeword number determined for the {run, levelID} pair. For CABAC coding, video encoder 20 may CABAC code a binarized value corresponding to a codeword number determined for the {run, levelID} pair.

In particular, video encoder 20 may code {run, levelID} pairs for the coefficients in an inverse scan order. For each {run, levelID} pair, video encoder 20 may determine a codeword number (cn), which represents an index to a codeword in a table (e.g., a VLC codeword in a VLC table or a binarized value in a binarization table) to use to encode the {run, levelID} pair. Additional details with respect to some examples for performing step 158 are discussed with respect to FIG. 6, below. Selecting codewords in this manner, video encoder 20 may output the coded data for the coefficients of the block (160). For example, for VLC, video encoder 20 may output the VLC codeword, whereas for CABAC, video encoder 20 may output CABAC coded data for the binarized value.

Figure 6:
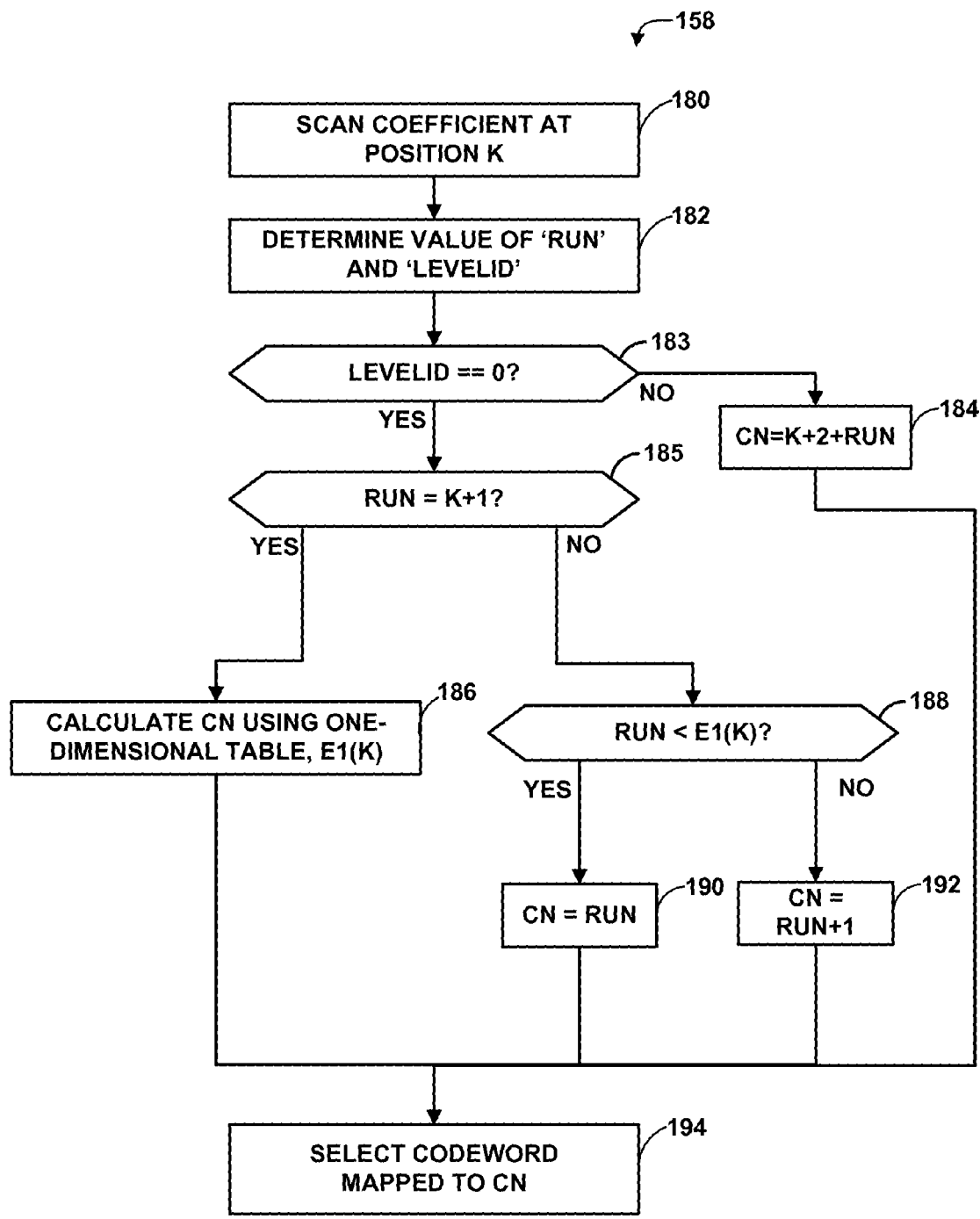
FIG. 6 is a flowchart illustrating an example method for encoding codeword indexes for coefficients of a current block.

FIG. 6 is a flowchart illustrating an example method for encoding codeword indexes for coefficients of a current block. In particular, the method of FIG. 6 illustrates an example of a method for performing step 158 of FIG. 5 in greater detail. The method of FIG. 6 is described with respect to a single coefficient, for which a single {run, levelID} pair is coded.

Initially, video encoder 20 scans (using an inverse scan order) the coefficient at position k (180). It is assumed that the coefficient has a k value that is less than a corresponding threshold, in this example. Video encoder 20 then determines the values of run and levelID for the coefficient (182). In particular, video encoder 20 may determine that a run is equal to the number of zero-valued coefficients between the current coefficient and the next non-zero valued coefficient, or the last coefficient in the inverse scan if there are no remaining non-zero valued coefficients. Likewise, video encoder 20 may determine that levelID has a value of '0' when the coefficient has an absolute value of '1,' or that levelID has a value of '1' when the coefficient has an absolute value greater than 1. In other words, let the coefficient at position k be called "A" and the next non-zero valued coefficient in scan order be called "B." A levelID equal to 0 may indicate that the absolute value of B is 1, and a levelID equal to 1 may indicate that the absolute value of B is greater than 1.

Video encoder 20 may then determine whether levelID has a value of '0' (183). If levelID does not have a value of '0,' ("NO" branch of 183) e.g., a value of '1,' video encoder 20 may set the value of cn equal to k+2+run (184). On the other hand, if levelID is equal to '0,' ("YES" branch of 183), video encoder 20 may further determine whether run is equal to k+1 (185). In particular, video encoder 20 may determine whether the current coefficient is the last non-zero-valued coefficient in the inverse scan order.

When video encoder 20 determines that run is equal to k+1 ("YES" branch of 185), video encoder 20 may calculate the value of cn for the {run, levelID} pair using a one-dimensional table (186), e.g., indexed to the value of k. Alternatively, video encoder 20 may execute a function that approximates the one-dimensional table, passing the function the value k. The function may return a value for cn based on the value of k. In this manner, video encoder 20 may execute a function to determine a mapping between data for the coefficient and a codeword index value, where cn is the codeword index value in this example.

On the other hand, if run is not equal to k+1 ("NO" branch of 185), video encoder 20 may determine whether run is less than E1(k), that is, the value returned by the one-dimensional for the value of k (188). If run is less than E1(k) ("YES" branch of 188), video encoder 20 may determine that cn has a value equal to run (190). On the other hand, if run is greater than E1(k) ("NO" branch of 188), video encoder 20 may determine that cn has a value equal to run+1 (192). Video encoder 20 may then select the codeword mapped to the determined value of cn (194), e.g., a VLC codeword from a VLC table or a binarized value from a binarization table for CABAC. Furthermore, for CABAC, video encoder 20 may entropy encode the selected binarized value.

In this manner, FIGS. 5 and 6 represent examples of a method of coding video data including, when a coefficient of a transform unit of video data has a scan order value that is less than a threshold and when the coefficient is the last significant coefficient in a scan order in the transform unit, executing a function to determine a mapping between data for the coefficient and a codeword index value, and coding the data for the coefficient using a codeword associated with the codeword index value.

Figure 7:
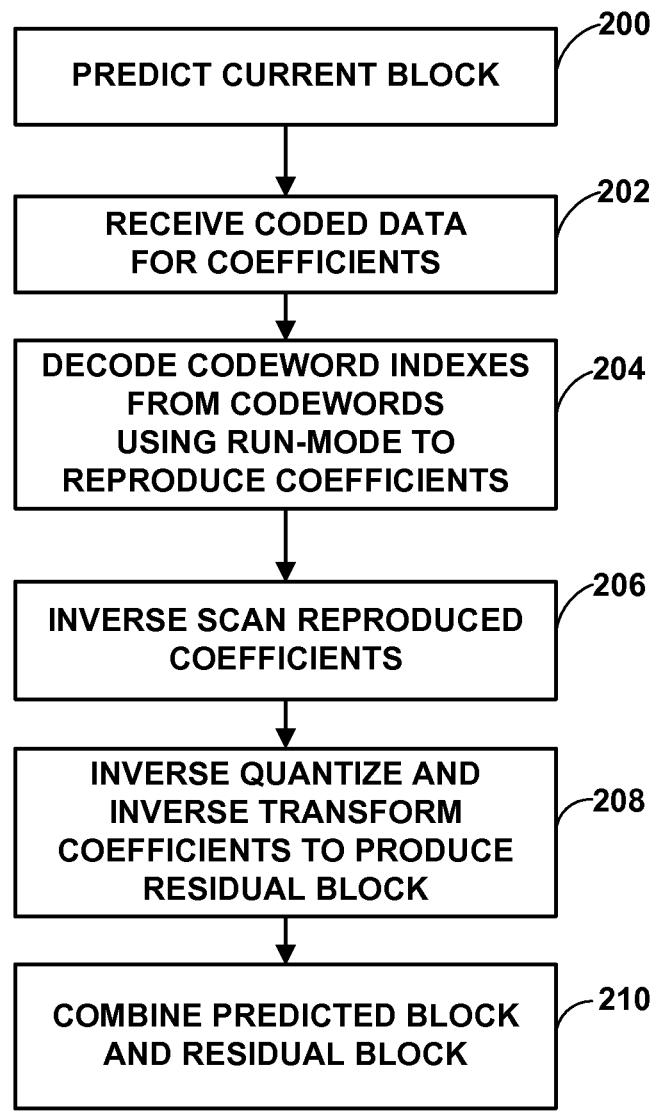
FIG. 7 is a flowchart illustrating an example method for decoding a current block of video data.

FIG. 7 is a flowchart illustrating an example method for decoding a current block of video data. The current block may comprise a current CU or a portion of the current CU. Although described with respect to video decoder 30 (FIGS. 1 and 3), it should be understood that other devices may be configured to perform a similar method.

Video decoder 30 may predict the current block (200), e.g., using an intra- or inter-prediction mode to calculate a predicted block for the current block. Video decoder 30 may also receive coded data corresponding to codewords for coefficients of a residual block corresponding to the current block (202). For example, in VLC, the coded data may be VLC codewords themselves, whereas for CABAC, the coded data may comprise CABAC coded data corresponding to a binarized value, which video decoder 30 may CABAC decode to reproduce the binarized value (that is, the codeword).

Video decoder 30 may determine codeword indexes to which the codewords are mapped, and decode the codeword indexes mapped from the codewords using run-mode to reproduce the data for the coefficients (204). Of course, as discussed above, the data for the coefficients corresponds to {run, levelID} pairs. Although not shown in FIG. 7, video decoder 30 may further decode level data for the coefficients that indicates the actual level values for the coefficients when the levelID indicates that the level value is greater than one. Video decoder 30 may also inverse scan the reproduced coefficients (206), to create a block of quantized transform coefficients. Video decoder 30 may then inverse quantize and inverse scan the coefficients to produce a residual block (208). The residual block may include residual coefficients in the pixel domain. Video decoder 30 may ultimately decode the current block by combining the predicted block and the residual block (210). That is, video decoder 30 may add the residual values and the predicted values to reproduce individual pixel values for the corresponding block.

Figure 8:
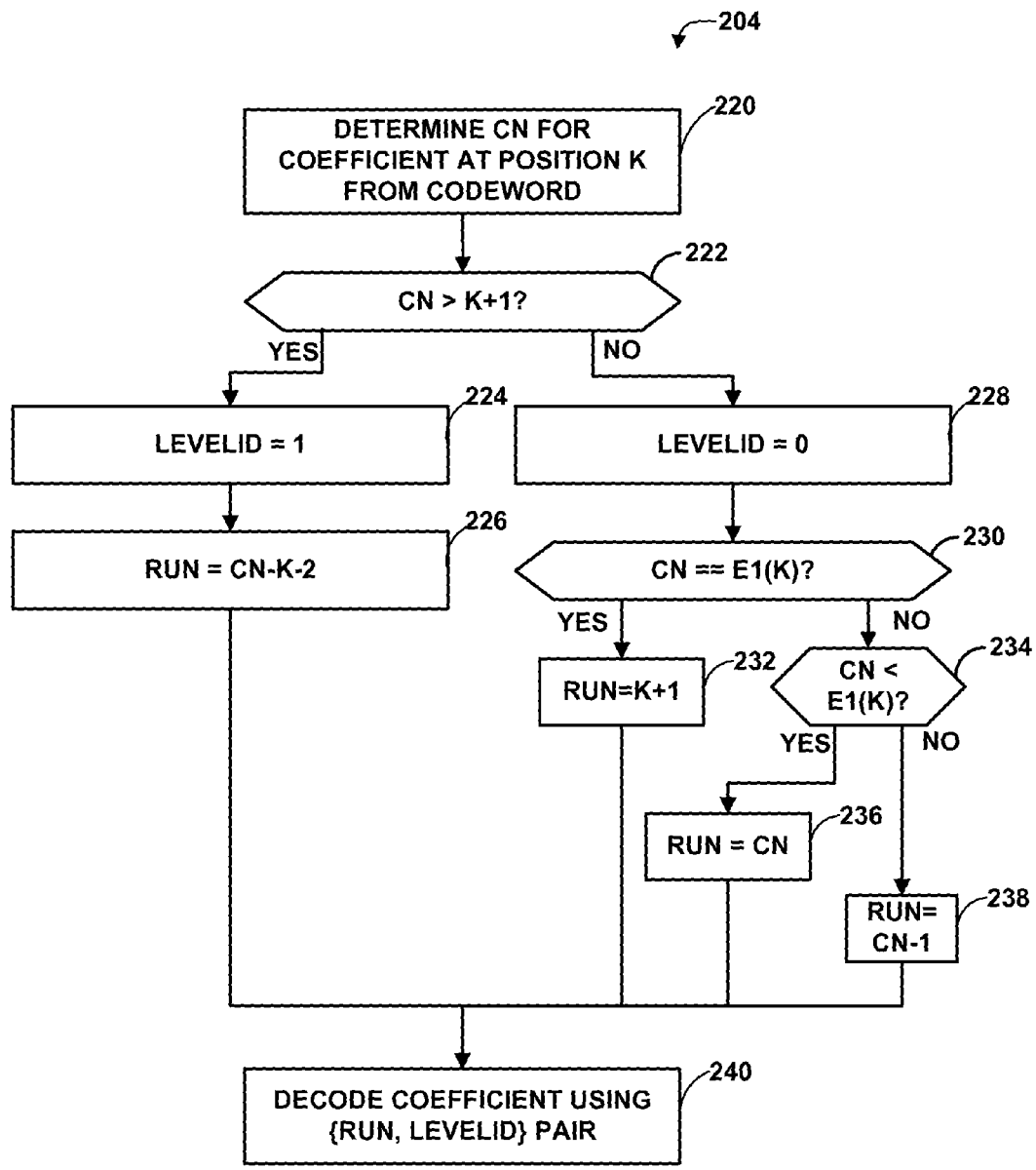
FIG. 8 is a flowchart illustrating an example method for decoding codeword indexes for coefficients of a current block.

FIG. 8 is a flowchart illustrating an example method for decoding codeword indexes. In particular, the method of FIG. 8 is an example of a method for performing step 204 of FIG. 7 in greater detail. The example of FIG. 8 is described with respect to a single codeword index value cn for a single coefficient, and it is assumed that this coefficient has a k value that is less than a threshold value.

In some examples, video decoder 30 may receive a VLC codeword, while in other examples, video decoder 30 may decode received CABAC coded data to reproduce a binarized value (that is, a codeword). In either case, video decoder 30 may determine a codeword index value cn for the coefficient at position k from the codeword for the coefficient (220). For example, video decoder 30 may determine a codeword index value to which a received VLC codeword is mapped from a VLC table. Alternatively, video decoder 30 may reproduce the binarized value and determine the codeword index using a binarization table. In this manner, video decoder 30 may code data for the coefficient using a codeword (e.g., a VLC codeword or a binarized value) associated with the codeword index value.

Video decoder 30 may then determine whether cn is greater than k+1 (222). If cn is greater than k+1 ("YES" branch of 222), video decoder 30 may determine that the levelID for the coefficient has a value of '1' (224) and that the run value for the coefficient has a value of cn−k−2 (226). In this manner, video decoder 30 may reconstruct the {run, levelID} pair for the coefficient when cn is greater than k+1.

On the other hand, when cn is not greater than k+1 ("NO" branch of 222), video decoder 30 may determine that levelID has a value of '0' (228). Moreover, video decoder 30 may determine whether cn is equal to the value returned by E1(k), that is, the value returned by a function executed on the value of k, where the function approximates a one-dimensional table (230). Alternatively, video decoder 30 may determine this value using an actual one-dimensional table. If the value returned by E1(k) is equal to cn ("YES" branch of 230), video decoder 30 may determine that run has a value of k+1 (232). In this manner, when the coefficient is the last significant coefficient in the scan order, video decoder 30 may execute a function to determine a mapping between data for the coefficient (e.g., the run value) and the codeword index value cn.

On the other hand, if the value returned by E1(k) is not equal to cn ("NO" branch of 230), video decoder 30 may determine whether cn is less than the value returned by E1(k) (234). If cn is less than the value returned by E1(k) ("YES branch of 234), video decoder 30 may determine that run has a value that is equal to cn (236). However, if cn is greater than the value returned by E1(k) ("NO" branch of 234), video decoder 30 may determine that run has a value equal to cn minus 1 (238). Video decoder 30 may then decode the coefficient using the determined {run, levelID} pair (240).

In this manner, the examples of FIGS. 7 and 8 represent examples of a method for coding data, the method including, when a coefficient of a transform unit of video data has a scan order value that is less than a threshold and when the coefficient is the last significant coefficient in a scan order in the transform unit, executing a function to determine a mapping between data for the coefficient and a codeword index value, and coding the data for the coefficient using a codeword associated with the codeword index value.

Although not shown in the examples of FIGS. 5-8, video encoder 20 and video decoder 30 may be configured to use other functions to determine mappings between data for a coefficient and a codeword index value for other circumstances. For example, video encoder 20 and video decoder 30 may be configured to execute a different function to determine the mapping for a coefficient having a {run, levelID} pair such that the run value is equal to a number of coefficients in the scan order to reach a second coefficient that is left of the first coefficient in the transform unit, and when the second coefficient has an absolute value greater than zero. As another example, video encoder 20 and video decoder 30 may be configured to execute yet another different function to determine the mapping for a coefficient having a {run, levelID} pair such that the run value is equal to a number of coefficients in the scan order to reach a second coefficient that is above the first coefficient in the transform unit, and when the second coefficient has an absolute value greater than zero.

Moreover, as noted above, it was assumed that the k value is less than a corresponding threshold in performing the methods of FIGS. 5-8. However, in other examples, video encoder 20 and video decoder 30 may perform these methods when k for a coefficient is between two thresholds. For example, video encoder 20 may perform the methods of FIGS. 5 and 6 when k is less than a first threshold T1 and greater than a second threshold T2. Likewise, video decoder 30 may perform the methods of FIGS. 7 and 8 when k is less than a first threshold T1 and greater than a second threshold T2. When k is greater than T1 or less than T2, however, video encoder 20 and video decoder 30 may perform alternative methods, in these examples. Furthermore, the methods may additionally include coding signaling data to determine values for the thresholds.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry, or combinations thereof. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising, by a video coder:
   when a first coefficient of a transform unit of video data has a first scan order value that is greater than or equal to a threshold or when the first coefficient is not the last significant coefficient in a scan order in the transform unit, the first scan order value representing a position of the first coefficient in the scan order:
      determining a first codeword index value for the first coefficient from a codeword table; and
      coding data for the first coefficient using a first codeword associated with the first codeword index value; and
   when a second coefficient of the transform unit has a second scan order value that is less than the threshold and when the second coefficient is the last significant coefficient in a scan order in the transform unit, the second scan order value representing a position of the second coefficient in the scan order:
      executing a function, using the second scan order value as input to the function, to determine a mapping between data for the second coefficient and a second codeword index value, wherein the function outputs the second codeword index value, wherein the function maps different scan order values combined with the data for the coefficient to different codeword index values, and wherein executing the function comprises executing the function without accessing the codeword table, wherein the function is separate from the codeword table; and
      coding the data for the second coefficient using a second codeword associated with the second codeword index value.

2. The method of claim 1, wherein the function comprises a first function, wherein the mapping comprises a first mapping, the method further comprising, when the data for the second coefficient comprises a {run, levelID} pair such that the run value is equal to a number of coefficients in the scan order to reach a third coefficient that is left of the first coefficient in the transform unit, and when the third coefficient has an absolute value greater than zero:
   executing a second function to determine a second mapping between the data for the second coefficient and a third codeword index value; and
   coding the data for the second coefficient using a third codeword associated with the third codeword index value.

3. The method of claim 1, wherein the function comprises a first function, wherein the mapping comprises a first mapping, the method further comprising, when the data for the second coefficient comprises a {run, levelID} pair such that the run value is equal to a number of coefficients in the scan order to reach a third coefficient that is above the second coefficient in the transform unit, and when the third coefficient has an absolute value greater than zero:
   executing a second function to determine a second mapping between the data for the second coefficient and a third codeword index value; and
   coding the data for the second coefficient using a third codeword associated with the third codeword index value.

4. The method of claim 1, wherein the threshold comprises a first threshold, and wherein executing the function and coding the data for the second coefficient comprises executing the function and coding the data for the second coefficient when the second scan order value is less than the first threshold value and greater than a second threshold value, wherein the second threshold value is less than the first threshold value.

5. The method of claim 1, further comprising coding a signaling value indicative of the threshold in at least one of a slice parameter set (SPS) for a slice including the transform unit, an adaptation parameter set (APS) for the slice including the transform unit, or a picture parameter set (PPS) for a picture including the transform unit.

6. The method of claim 1, wherein coding the data for the second coefficient comprises encoding a {run, levelID} pair for the coefficient using the second codeword during a video encoding process.

7. The method of claim 1, wherein coding the data for the second coefficient comprises determining a {run, levelID} pair for the second coefficient using the second codeword during a video decoding process.

8. The method of claim 1, wherein the second codeword comprises a binarized value, and wherein coding the data for the second coefficient further comprises entropy coding the binarized value using context adaptive binary arithmetic coding (CABAC).

9. The method of claim 1, wherein coding the data for the second coefficient comprises decoding the second codeword to reproduce the second codeword index value, and wherein executing the function comprises executing the function after decoding the second codeword to determine the data for the second coefficient from the second codeword index value.

10. The method of claim 9, wherein decoding the second codeword comprises entropy decoding data to reproduce a binarized value, wherein the binarized value comprises the second codeword, and determining the second codeword index value to which the binarized value corresponds.

11. The method of claim 9, further comprising determining predictive data corresponding to the transform unit, reproducing residual data for the transform unit, and combining the predictive data and the residual data.

12. The method of claim 1, wherein coding the data for the second coefficient comprises encoding the data for the second coefficient using the second codeword after executing the function.

13. A device for coding video data, the device comprising:
a memory configured to store video data; and
a video coder configured to:
when a first coefficient of a transform unit of video data has a first scan order value that is greater than or equal to a threshold or when the first coefficient is not the last significant coefficient in a scan order in the transform unit, the first scan order value representing a position of the first coefficient in the scan order:
determine a first codeword index value for the first coefficient from a codeword table; and
code data for the first coefficient using a first codeword associated with the first codeword index value; and
when a second coefficient of the transform unit has a second scan order value that is than a threshold and when the coefficient is the last significant coefficient in a scan order in the transform unit, the second scan order value representing a position of the second coefficient in the scan order:
execute a function, using the second scan order value as input to the function, to determine a mapping between data for the second coefficient and a second codeword index value, wherein the function outputs the second codeword index value, wherein the function maps different scan order values combined with the data for the coefficient to different codeword index values, and wherein the video coder is configured to execute the function without accessing the codeword table, wherein the function is separate from the codeword table, and
code the data for the second coefficient using a second codeword associated with the second codeword index value.

14. The device of claim 13, wherein the function comprises a first function, wherein the mapping comprises a first mapping, and wherein the video coder is further configured to, when the data for the second coefficient comprises a {run, levelID} pair such that the run value is equal to a number of coefficients in the scan order to reach a third coefficient that is left of the second coefficient in the transform unit, and when the third coefficient has an absolute value greater than zero, execute a second function to determine a second mapping between the data for the second coefficient and a third codeword index value, and code the data for the second coefficient using a third codeword associated with the third codeword index value.

15. The device of claim 13, wherein the function comprises a first function, wherein the mapping comprises a first mapping, and wherein the video coder is further configured to, when the data for the second coefficient comprises a {run, levelID} pair such that the run value is equal to a number of coefficients in the scan order to reach a third coefficient that is above the second coefficient in the transform unit, and when the third coefficient has an absolute value greater than zero, execute a second function to determine a second mapping between the data for the second coefficient and a third codeword index value, and code the data for the second coefficient using a third codeword associated with the third codeword index value.

16. The device of claim 13, wherein the threshold comprises a first threshold, and wherein the video coder is configured to execute the function and code the data for the second coefficient when the second scan order value is less than the first threshold value and greater than a second threshold value, wherein the second threshold value is less than the first threshold value.

17. The device of claim 13, wherein the video coder is further configured to code a signaling value indicative of the threshold in at least one of a slice parameter set (SPS) for a slice including the transform unit, an adaptation parameter set (APS) for the slice including the transform unit, or a picture parameter set (PPS) for a picture including the transform unit.

18. The device of claim 13, wherein the video coder comprises a video decoder.

19. The device of claim 18, wherein to code the data for the second coefficient, the video decoder is configured to determine a {run, levelID} pair for the coefficient using the second codeword.

20. The device of claim 18, wherein the video decoder is configured to decode the second codeword to reproduce the second codeword index value, and wherein to execute the function, the video decoder is configured to execute the function after decoding the second codeword to determine the data for the second coefficient from the second codeword index value.

21. The device of claim 13, wherein the video coder comprises a video encoder.

22. The device of claim 21, wherein to code the data for the second coefficient, the video encoder is configured to encode a {run, levelID} pair for the second coefficient using the second codeword during a video encoding process.

23. The device of claim 13, wherein the second codeword comprises a binarized value, and wherein to code the data for the second coefficient, the video coder is configured to code the binarized value using context adaptive binary arithmetic coding (CABAC).

24. A device for coding video data, the device comprising:
means for determining a first codeword index value for a first coefficient of a transform unit from a codeword table when the first coefficient has a first scan order value that is greater than or equal to a threshold or when the first coefficient is not the last significant coefficient in a scan order in the transform unit the first scan order value representing a position of the first coefficient in the scan order;
means for coding data for the first coefficient using a first codeword associated with the first codeword index value;
means for executing a function, using a second scan order value of a second coefficient as input to the function, to determine a mapping between data for the second coefficient and a second codeword index value, wherein the function outputs the second codeword index value, when the second scan order value of the coefficient is less than a threshold and when the second coefficient is the last significant coefficient in the scan order in the transform unit, and wherein the function maps different scan order values combined with the data for the second coefficient to different codeword index values, the second scan order value representing a position of the second coefficient in the scan order, and wherein the means for executing the function comprises means for executing the function without accessing the codeword table, wherein the function is separate from the codeword table; and
means for coding the data for the second coefficient using a second codeword associated with the second codeword index value when the second coefficient has the second scan order value and when the second coefficient is the last significant coefficient in the scan order in the transform unit.

25. The device of claim 24, wherein the function comprises a first function, wherein the mapping comprises a first mapping, further comprising:
means for executing, when the data for the second coefficient comprises a {run, levelID} pair such that the run value is equal to a number of coefficients in the scan order to reach a third coefficient that is left of the second coefficient in the transform unit, and when the third coefficient has an absolute value greater than zero, a second function to determine a second mapping between the data for the second coefficient and a third codeword index value; and
means for coding, when the data for the second coefficient comprises the {run, levelID} pair and when the third coefficient has the value greater than zero, the data for the second coefficient using a third codeword associated with the third codeword index value.

26. The device of claim 24, wherein the function comprises a first function, wherein the mapping comprises a first mapping, further comprising:
means for executing, when the data for the second coefficient comprises a {run, levelID} pair such that the run value is equal to a number of coefficients in the scan order to reach a third coefficient that is above the second coefficient in the transform unit, and when the third coefficient has an absolute value greater than zero, a second function to determine a second mapping between the data for the second coefficient and a third codeword index value; and
means for coding, when the data for the second coefficient comprises the {run, levelID} pair and when the third coefficient has the value greater than zero, the data for the second coefficient using a third codeword associated with the third codeword index value.

27. The device of claim 24, wherein the threshold comprises a first threshold, and wherein the means for executing the function and the means for coding the data for the second coefficient comprises means for executing the function and means for coding the data for the second coefficient when the second scan order value is less than the first threshold value and greater than a second threshold value, wherein the second threshold value is less than the first threshold value.

28. The device of claim 24, further comprising means for coding a signaling value indicative of the threshold in at least one of a slice parameter set (SPS) for a slice including the transform unit, an adaptation parameter set (APS) for the slice including the transform unit, or a picture parameter set (PPS) for a picture including the transform unit.

29. The device of claim 24, wherein the means for coding the data for the second coefficient comprises means for determining a {run, levelID} pair for the coefficient using the second codeword during a video decoding process.

30. The device of claim 29, wherein the means for coding the data for the second coefficient comprises means for decoding the second codeword to reproduce the second codeword index value, and wherein the means for executing the function comprises means for executing the function after decoding the second codeword to determine the data for the second coefficient from the second codeword index value.

31. The device of claim 24, wherein the means for coding the data for the second coefficient comprises means for encoding a {run, levelID} pair for the coefficient using the second codeword during a video encoding process.

32. The device of claim 24, wherein the second codeword comprises a binarized value, and wherein the means for coding the data for the second coefficient further comprises means for entropy coding the binarized value using context adaptive binary arithmetic coding (CABAC).

33. A non-transitory computer-readable storage medium having stored thereon instructions that, when executed, cause a processor of a device for coding video data to:
when a first coefficient of a transform unit of video data has a first scan order value that is greater than or equal to a threshold or when the first coefficient is not the last significant coefficient in a scan order in the transform unit, the first scan order value representing a position of the first coefficient in the scan order:
determine a first codeword index value for the first coefficient from a codeword table; and
code data for the first coefficient using a first codeword associated with the first codeword index value; and
when a second coefficient of the transform unit has a second scan order value that is less than a threshold and when the coefficient is the last significant coefficient in a scan order in the transform unit, the second scan order value representing a position of the second coefficient in the scan order:
execute a function, using the second scan order value as input to the function, to determine a mapping between data for the second coefficient and a second codeword index value, wherein the function outputs the second codeword index value, wherein the function maps different scan order values combined with the data for the coefficient to different codeword index values, and wherein the instructions that cause the processor to execute the function comprise instructions that cause the processor to execute the function without accessing the codeword table, wherein the function is separate from the codeword table; and
code the data for the second coefficient using a second codeword associated with the second codeword index value.

34. The non-transitory computer-readable storage medium of claim 33, wherein the function comprises a first function, wherein the mapping comprises a first mapping, further comprising instructions that cause the processor to, when the data for the second coefficient comprises a {run, levelID} pair such that the run value is equal to a number of coefficients in the scan order to reach a third coefficient that is left of the second coefficient in the transform unit, and when the third coefficient has an absolute value greater than zero:
execute a second function to determine a second mapping between the data for the second coefficient and a third codeword index value; and
code the data for the second coefficient using a codeword associated with the third codeword index value.

35. The non-transitory computer-readable storage medium claim 33, wherein the function comprises a first function, wherein the mapping comprises a first mapping, further comprising instructions that cause the processor to, when the data for the second coefficient comprises a {run, levelID} pair such that the run value is equal to a number of coefficients in the scan order to reach a third coefficient that is above the first coefficient in the transform unit, and when the third coefficient has an absolute value greater than zero:

execute a second function to determine a second mapping between the data for the second coefficient and a third codeword index value; and code the data for the second coefficient using a third codeword associated with the third codeword index value.

36. The non-transitory computer-readable storage medium of claim 33, wherein the threshold comprises a first threshold, and wherein the instructions that cause the processor to execute the function and the instructions that cause the processor to code the data for the second coefficient comprise instructions that cause the processor to execute the function and instructions that cause the processor to code the data for the second coefficient when the second scan order value is less than the first threshold value and greater than a second threshold value, wherein the second threshold value is less than the first threshold value.

37. The non-transitory computer-readable storage medium of claim 33, further comprising instructions that cause the processor to code a signaling value indicative of the threshold in at least one of a slice parameter set (SPS) for a slice including the transform unit, an adaptation parameter set (APS) for the slice including the transform unit, or a picture parameter set (PPS) for a picture including the transform unit.

38. The non-transitory computer-readable storage medium of claim 33, wherein the instructions that cause the processor to code the data for the second coefficient comprise instructions that cause the processor to decode the data for the second coefficient.

39. The non-transitory computer-readable storage medium of claim 38, wherein the instructions that cause the processor to code the data for the second coefficient comprise instructions that cause the processor to determine a {run, levelID} pair for the coefficient using the second codeword.

40. The method of claim 1, the method being executable on a wireless communication device, wherein the device comprises:
    a memory configured to store the video data;
    a processor configured to execute instructions to process the video data stored in said memory; and
    one or both of a transmitter and a receiver that are respectively configured to transmit or receive an encoded video bitstream that includes the data for the second coefficient.

41. The method of claim 40, wherein the wireless communication device is a cellular telephone and the encoded video bitstream is respectively transmitted or received by the transmitter or receiver and modulated according to a wireless communication standard.

42. The device of claim 13, wherein the device is a wireless communication device, the device further comprising one or both of:
    a transmitter; and
    a receiver,
    the transmitter and the receiver respectively being configured to transmit or receive an encoded video bitstream that includes the data for the second coefficient.

43. The device of claim 42, wherein the wireless communication device is a cellular telephone and the encoded video bitstream is respectively transmitted or received by the transmitter or receiver and modulated according to a wireless communication standard.

* * * * *